(12) United States Patent
Oka

(10) Patent No.: US 11,773,950 B2
(45) Date of Patent: Oct. 3, 2023

(54) TRACTOR, TRAVEL POWER TRANSMISSION APPARATUS FOR A TRACTOR, AND TRACTOR PROVIDED WITH THE TRAVEL POWER TRANSMISSION APPARATUS FOR A TRACTOR

(71) Applicant: Kubota Corporation, Osaka (JP)

(72) Inventor: Yasuyuki Oka, Sakai (JP)

(73) Assignee: Kubota Corporation, Osaka (JP)

( * ) Notice: Subject to any disclaimer, the term of this patent is extended or adjusted under 35 U.S.C. 154(b) by 621 days.

(21) Appl. No.: 16/618,943

(22) PCT Filed: Sep. 2, 2019

(86) PCT No.: PCT/JP2019/034433
§ 371 (c)(1),
(2) Date: Dec. 3, 2019

(87) PCT Pub. No.: WO2020/050216
PCT Pub. Date: Mar. 12, 2020

(65) Prior Publication Data
US 2021/0341043 A1    Nov. 4, 2021

(30) Foreign Application Priority Data

Sep. 5, 2018   (JP) ................................ 2018-166369
Sep. 5, 2018   (JP) ................................ 2018-166371

(51) Int. Cl.
*F16H 37/00*     (2006.01)
*F16H 37/04*     (2006.01)
(Continued)

(52) U.S. Cl.
CPC ........... *F16H 37/043* (2013.01); *F16H 3/093* (2013.01); *F16H 63/345* (2013.01); *F16H 63/36* (2013.01);
(Continued)

(58) Field of Classification Search
CPC ............... F16H 3/093; F16H 2037/044; F16H 2037/045; F16H 2200/0004; F16H 2200/0026
See application file for complete search history.

(56) References Cited

U.S. PATENT DOCUMENTS 2,975,656 A * 3/1961 Haverlender ............. F16H 3/16
74/15.84
3,897,699 A * 8/1975 Hoyer ..................... F16H 3/093
74/360
(Continued)

FOREIGN PATENT DOCUMENTS

CN        102817997 A    12/2012
EP          0314644 A2     5/1989
(Continued)

*Primary Examiner* — William C Joyce
(74) *Attorney, Agent, or Firm* — THE WEBB LAW FIRM

(57) ABSTRACT

Regarding a travel power transmission apparatus for a tractor, in which a creep speed changing apparatus is housed in a transmission case, the present invention increases a deceleration ratio throughout the creep speed change while suppressing an increase in the size of the transmission case. A creep speed changing apparatus includes: a first power transmission gear that is provided on an output shaft gear of a gear transmission; a first deceleration gear that is supported by a relay shaft so as to be rotatable relative to the relay shaft, in a state of meshing with the first power transmission gear; a second power transmission gear that is provided on the first deceleration gear; a second deceleration gear that is supported by an output shaft of the gear transmission so as to be rotatable relative to the output shaft, in a state of meshing with the second power transmission gear; a third power transmission gear that is provided on the second deceleration gear; a third deceleration gear that is supported by the relay shaft so as not to be rotatable relative (Continued)

to the relay shaft, in a state of meshing with the third power transmission gear; and a pair of deceleration gears that are provided so as to span the relay shaft and the output shaft, and decelerate power from the relay shaft and transmit the resulting power to the output shaft.

6 Claims, 10 Drawing Sheets

(51) Int. Cl.
  *F16H 3/093* (2006.01)
  *F16H 63/34* (2006.01)
  *F16H 63/36* (2006.01)
  *F16H 3/08* (2006.01)
(52) U.S. Cl.
  CPC ............... *F16H 2003/0822* (2013.01); *F16H 2037/044* (2013.01); *F16H 2037/045* (2013.01); *F16H 2200/0004* (2013.01); *F16H 2200/0026* (2013.01); *F16H 2312/06* (2013.01); *F16H 2312/09* (2013.01)

(56) References Cited

U.S. PATENT DOCUMENTS

| | | | | |
|---|---|---|---|---|
| 4,716,775 | A | * | 1/1988 | Horii ..................... F16H 37/043 74/15.86 |
| 5,901,606 | A | * | 5/1999 | Umemoto ............. F16H 37/043 74/606 R |
| 6,612,193 | B2 | * | 9/2003 | Umemoto ............... F16H 3/097 74/606 R |
| 2004/0118627 | A1 | | 6/2004 | Ohtsuki et al. |
| 2006/0243513 | A1 | | 11/2006 | Tsuji |

FOREIGN PATENT DOCUMENTS

| | | |
|---|---|---|
| EP | 1059468 A2 | 12/2000 |
| JP | 5850253 U | 4/1983 |
| JP | 5850254 U | 4/1983 |
| JP | 10006789 A | 1/1998 |
| JP | 10006792 A | 1/1998 |
| JP | 2003130150 A | 5/2003 |
| JP | 2006090477 A | 4/2006 |

* cited by examiner

TRACTOR, TRAVEL POWER TRANSMISSION APPARATUS FOR A TRACTOR, AND TRACTOR PROVIDED WITH THE TRAVEL POWER TRANSMISSION APPARATUS FOR A TRACTOR

CROSS-REFERENCE TO RELATED APPLICATIONS

This application is the United States national phase of International Application No. PCT/JP2019/034433 filed Sep. 2, 2019, and claims priority to Japanese Patent Application Nos. 2018-166369 and 2018-166371 filed Sep. 5, 2018, the disclosures of which are hereby incorporated by reference in their entirety.

TECHNICAL FIELD

The present invention relates to a travel power transmission apparatus for tractors, and a tractor that is provided with the travel power transmission apparatus for tractors. The present invention also relates to a tractor that includes a transmission case that houses a differential mechanism for transmitting power to an axle, and an axle case that is coupled to a side portion of the transmission case with a coupling bolt, and supports the axle so as to be rotatable.

BACKGROUND ART

Background Art 1

There is a travel power transmission apparatus for tractors that includes: a gear transmission to which power from an engine is input, and that changes the speed of the input power and outputs the resulting power; a creep speed changing apparatus to which the output from the gear transmission is input, and that decelerates the input power and outputs the resulting power to a differential mechanism for a rear wheel; and a transmission case that houses the gear transmission and the creep speed changing apparatus.

An example of a creep speed changing apparatus included in this type of a travel power transmission apparatus for tractors is disclosed in Patent Document 1. The creep speed changing apparatus disclosed in Patent Document 1 includes: a creep input gear that is integrated with a low-speed third gear of an auxiliary speed changing apparatus; a deceleration gear that meshes with the creep input gear; a creep output gear that is provided side by side with the acceleration gear; and a creep gear that meshes with the creep output gear. That is to say, power from the low-speed third gear is decelerated while being transmitted between the creep input gear and the deceleration gear, and the decelerated power is decelerated while being transmitted between the creep output gear and the creep gear, and the resulting power is input from a transmission shaft to a rear wheel differential apparatus.

Background Art 2

As disclosed in Patent Document 2, for example, the above-described tractor may include a brake apparatus that has brake discs, a disc receiver, and a rotating cam that presses the brake discs against the disc receiver, and that performs a braking action on an axle.

PRIOR ART DOCUMENTS

Patent Documents

Patent Document 1: JP H10-6792A
Patent Document 2: JP H10-6789A

SUMMARY OF THE INVENTION

Problems to be Solved by the Invention

Problem 1
A problem corresponding to Background Art 1 is as follows. Conventionally, creep speed change is performed using two pairs of gears, and gears with a large gear diameter are needed to increase a deceleration ratio throughout creep speed change. Therefore, the transmission case needs to be large.

The present invention provides a travel power transmission apparatus for tractors that can increase the deceleration ratio throughout the creep speed change while suppressing an increase in the size of the transmission case, and also provides a tractor.

Problem 2
A problem corresponding to Background Art 2 is as follows. Conventionally, a brake apparatus is housed in an axle case, and a braking reaction force is applied to the axle case when a brake is applied. Therefore, particularly in a large tractor that needs a large braking force, the axle case needs to be strong enough to bear a large braking reaction force, which increases the cost of the axle case. Also, the axle case will be heavy.

The present invention provides a tractor that can realize a large braking force, while avoiding an increase in the cost and the weight of the axle case.

Means for Solving Problems

A solution corresponding to Problem 1 is as follows.
A travel power transmission apparatus for a tractor according to the present invention includes: a gear transmission to which power from an engine is input, and that changes the speed of the input power and outputs the resulting power; a creep speed changing apparatus to which the output from the gear transmission is input, and that decelerates the input power and outputs the resulting power to a differential mechanism for a rear wheel; and a transmission case that houses the gear transmission and the creep speed changing apparatus. The gear transmission includes: an output shaft that transmits power to the differential mechanism; and an output shaft gear that is supported by the output shaft, and is switchable to a power transmission ON state in which the output shaft gear engages with the output shaft so as not to be rotatable relative to the output shaft, and transmits power to the output shaft, and to a power transmission OFF state in which the output shaft gear is disengaged from the output shaft and disconnects power transmission to the output shaft, and the creep speed changing apparatus includes: a relay shaft that is parallel with the output shaft; a first power transmission gear that is provided so as not to be rotatable relative to the output shaft gear; a first deceleration gear that is supported by the relay shaft so as to be rotatable relative to the relay shaft, in a state of meshing with the first power transmission gear, and rotates at a lower speed than the first power transmission gear; a second power transmission gear that is provided so as not to be rotatable relative to the first deceleration gear; a second deceleration gear that is supported by the output shaft so as to be rotatable relative to the output shaft, in a state of meshing with the second power transmission gear, and rotates at a lower speed than the second power transmission gear; a third power transmission gear that is provided so as not to be rotatable relative to the second deceleration gear; a third deceleration gear that is supported by the relay shaft so as not to be rotatable relative to the relay shaft, in a state of meshing with the third power transmission gear, and rotates at a lower speed than the third power transmission gear; and a pair of deceleration gears that are provided so as to span the relay shaft and the output shaft, and are switchable to a power transmission ON state in which the pair of deceleration gears decelerate power from the relay shaft and transmit the resulting power to the output shaft, and a power transmission OFF state in which the pair of deceleration gears disconnect power transmission to the output shaft.

With this configuration, creep speed change is performed on power from the output shaft gear using four pairs of gears, namely the pair consisting of the first power transmission gear and the first deceleration gear, the pair consisting of the second power transmission gear and the second deceleration gear, the pair consisting of the third power transmission gear and the third deceleration gear, and the pair of deceleration gears. That is to say, creep speed change is performed using a larger number of pairs of gears than conventional art. Therefore, even if gears that have a smaller diameter than gears in conventional art are used in the pairs of gears, it is possible to perform creep speed change at the same deceleration ratio as conventional art, or at a higher deceleration ratio than conventional art. The output shaft is used as a support shaft for the second deceleration gear, and there is no need to provide a special support shaft for the second deceleration gear.

Therefore, it is possible to increase the deceleration ratio throughout the creep speed change such that travel at a very low speed can be realized, while suppressing an increase in the size of the transmission case.

In the present invention, it is preferable that the pair of deceleration gears are located on the opposite side to the first deceleration gear with respect to the output shaft gear in a direction in which an axis of the relay shaft extends.

With this configuration, the pair of deceleration gears and the first deceleration gear can be distributed in a space on the side of one end of the relay shaft relative to the output shaft gear and in a space on the side of the other end of the relay shaft relative to the output shaft gear. Therefore, it is easier to use an empty space in the transmission case as an installation space, and it is possible to suppress an increase in the size of the transmission case.

In the present invention, it is preferable that the relay shaft is provided at a position lower than the output shaft, and a clutch that switches the pair of deceleration gears to the power transmission ON state and the power transmission OFF state is provided so as to span a power transmission gear that is one gear of the pair of deceleration gears and is supported by the relay shaft, and the relay shaft.

With this configuration, the clutch can be provided in the space in the transmission case on the side of the bottom of the transmission case. Therefore, it is easier to make a structure for operating the clutch from the outside of the transmission case more compact.

In the present invention, it is preferable that travel power transmission apparatus further includes: a forward/rearward travel switching apparatus that includes a clutch unit to which power from the engine is input and that converts the input power into forward travel power and rearward travel power, and separately includes a forward travel output unit that outputs thus converted forward travel power, and a rearward travel output unit that outputs the thus converted rearward travel power; a rotating power transmission shaft that is provided so as to span the rearward travel output unit and an input part of the gear transmission, and transmits power from the rearward travel output unit to the input part; and a high/low speed switching apparatus that is provided so as to span the forward travel output unit and the rotating power transmission shaft, and is switchable to a high-speed power transmission state in which the high/low speed switching apparatus changes the speed of power from the forward travel output unit to a high-side speed and transmits the resulting power to the rotating power transmission shaft, and a low-speed power transmission state in which the high/low speed switching apparatus changes the speed of power from the forward travel output unit to a low-side speed and transmits the resulting power to the rotating power transmission shaft.

With this configuration, rearward travel power output from the forward/rearward travel switching apparatus is input to the gear transmission without being subjected to speed changing action performed by the high/low speed switching apparatus, and forward travel power output from the forward/rearward travel switching apparatus is input to the gear transmission after being changed by the high/low speed switching apparatus to power of a high-side speed and power of a low-side speed. Therefore, it is possible to realize a power transmission structure with a simple configuration that can switch to forward travel and rearward travel by simply switching the forward/rearward travel switching apparatus, while realizing a speed change during forward travel.

In the present invention, it is preferable that the rotating power transmission shaft and the input part are coaxially arranged in a straight line.

With this configuration, the rotating power transmission shaft and the input part have a positional relationship in which they can be easily coupled to each other. Therefore, it is possible to interlock the rotating power transmission shaft and the input part with each other using a coupling means with a simple configuration.

In the present invention, it is preferable that the rearward travel output unit is provided forward of the clutch unit and the forward travel output unit is provided rearward of the clutch unit.

With this configuration, the rearward travel output unit and the forward travel output unit do not overlap each other, and it is possible to realize a forward/rearward travel switching apparatus with a simple configuration.

A travel power transmission apparatus for a tractor according to another aspect of the present invention includes: a forward/rearward travel switching apparatus to which power from an engine is input, that converts the input power into forward travel power and rearward travel power, and separately includes a forward travel output unit that outputs the thus converted forward travel power, and a rearward travel output unit that outputs the thus converted rearward travel power; a gear transmission that includes an input part to which power is input, and that changes the speed of power input to the input part and outputs the resulting power to a travel apparatus; a rotating power transmission shaft that is provided so as to span the rearward travel output unit and the input part, and transmits power from the rearward travel output unit to the input part; and a high/low speed switching apparatus that is provided so as to span the forward travel output unit and the rotating power transmission shaft, changes the speed of power output from the rotating power transmission shaft to a high-side speed and a low-side speed, and outputs power of the high-side speed and power of the low-side speed resulting from the speed change to the rotating power transmission shaft.

With this configuration, rearward travel power output from the forward/rearward travel switching apparatus is input to the gear transmission without being subjected to speed changing action performed by the high/low speed switching apparatus, and forward travel power output from the forward/rearward travel switching apparatus is input to the gear transmission after being changed by the high/low speed switching apparatus to power of a high-side speed and power of a low-side speed. Therefore, it is possible to realize a power transmission structure with a simple configuration that can switch to forward travel and rearward travel by simply switching the forward/rearward travel switching apparatus, while realizing a speed change during forward travel.

The travel power transmission apparatus for a tractor according to the present invention is applicable to a tractor.

With a tractor that is provided with the travel power transmission apparatus for a tractor according to the present invention, it is possible to realize a tractor that can travel at a very low speed and make it easier to perform work while suppressing an increase in the size of the tractor.

A solution corresponding to Problem 2 is as follows.

A tractor according to the present invention includes: a transmission case that houses a differential mechanism that transmits power to an axle; an axle case that is coupled to a side portion of the transmission case, using a coupling bolt, and supports the axle so as to be rotatable; and a brake apparatus that includes a brake disc, a disc receiver, and a rotating cam that presses the brake disc against the disc receiver, and performs a braking action on the axle. The brake disc, the disc receiver, and the rotating cam are housed in the transmission case.

When a brake is applied, a braking reaction force is applied to transmission case. However, with the above-described configuration, the transmission case that has the function of housing the differential mechanism, for example, is provided with high strength. Therefore, it is possible to provide a brake apparatus that can achieve a large braking force while suppressing the braking reaction force that is applied to the axle case.

Therefore, it is possible to provide a large braking force while avoiding an increase in the costs and weight of the axle case when the strength of the axle case is increased.

In the present invention, it is preferable that tractor further includes: a cam operation arm that is provided in the transmission case so as to be swingable, and rotates the rotating cam; a brake operation part that is provided outside the transmission case so as to be swingable, and operates the cam operation arm so as to swing; and a rotation support shaft that is attached to a through hole in a side wall portion of the transmission case so as to be rotatable, is coupled to the cam operation arm and the brake operation part, supports the cam operation arm and the brake operation part so as to be swingable relative to the side wall portion, and interlocks the cam operation arm and the brake operation part with each other.

With this configuration, upon the brake operation part being operated, the rotation support shaft rotates, the cam operation arm is operated by the rotation support shaft so as to swing and rotate the rotating cam, and the rotating cam presses the brake disc against the disc receiver. Therefore, it is possible to enable the brake apparatus to be operated by simply coupling a member such as an interlock rod to which the brake pedal is to be coupled, to the brake operation part outside the transmission case.

In the present invention, it is preferable that the tractor further includes a boss member that is fitted onto the rotation support shaft so as to be rotatable relative to the rotation support shaft, is fixed to the side wall portion so as to pass through the through hole, and supports the rotation support shaft, and a cam operation arm-side portion of the boss member protrudes from the side wall portion to the inside of the transmission case, and abuts against a base end-side portion of the cam operation arm.

With this configuration, the positional relationship between the cam operation arm and the side wall portion is set by the boss member to be a positional relationship in which a gap is formed between the cam operation arm and the side wall portion, and even if the inner surface of the side wall portion remains a cast surface, the cam operation arm swings smoothly without being adversely affected by the cast surface. Therefore, even if the inner surface of the side wall portion is not processed to be, or is unable to be processed to be a flat surface, it is possible to smoothly operate the brake apparatus by smoothly swinging the cam operation arm.

In the present invention, it is preferable that a brake operation part-side portion of the boss member protrudes from the side wall portion to the outside of the transmission case, and abuts against a base end-side portion of the brake operation p art.

With this configuration, the positional relationship between the brake operation part and the side wall portion is set by the boss member to be a positional relationship in which a gap is formed between the brake operation part and the side wall portion, and a member that is to be coupled to the brake operation part, such as an interlock rod, can be easily coupled thereto without coming into contact with the side wall portion. Therefore, it is possible to operate the brake operation part so as to smoothly swing without being affected by resistance of the side wall portion, and it is possible to efficiently attach a brake operation system to the brake operation part.

In the present invention, it is preferable that the tractor further includes: a work hole that is formed in a portion above the cam operation arm, of an upper wall portion of the transmission case; and a lid member that opens and closes the work hole.

With this configuration, it is possible to perform work on the cam operation arm and so on by putting a tool or a hand into the transmission case from the outside of the transmission case through the work hole. Therefore, it is easy to attach the cam operation arm and so on.

A tractor according to the present invention includes: a vehicle body frame that has a transmission case that houses a differential mechanism that transmits power to an axle, and an axle case that is coupled to a side portion of the transmission case, using a coupling bolt, and supports the axle so as to be rotatable; a brake apparatus that is provided inside the vehicle body frame, and performs a braking action on the axle; a cam operation arm that is provided in the transmission case so as to be swingable, and switches the brake apparatus ON and OFF; a brake operation part that is provided outside the transmission case so as to be swingable, and operates the cam operation arm so as to swing; a rotation support shaft that is attached to a through hole in a side wall portion of the transmission case so as to be rotatable, is coupled to the cam operation arm and the brake operation part, supports the cam operation arm and the brake operation part so as to be swingable relative to the side wall portion, and interlocks the cam operation arm and the brake operation part with each other; and a boss member that is fitted onto the rotation support shaft so as to be rotatable relative to the rotation support shaft, is fixed to the side wall portion so as to pass through the through hole, and supports the rotation support shaft. A cam operation arm-side portion of the boss member protrudes from the side wall portion to the inside of the transmission case, and abuts against a base end-side portion of the cam operation arm, and a brake operation part-side portion of the boss member protrudes from the side wall portion to the outside of the transmission case, and abuts against a base end-side portion of the brake operation part.

With this configuration, upon the brake operation part being operated, the rotation support shaft rotates, the cam operation arm is operated by the rotation support shaft so as to swing and rotate the rotating cam, and the rotating cam presses the brake disc against the disc receiver. Therefore, it is possible to make the brake apparatus operable by simply coupling a member such as an interlock rod to which the brake pedal is to be coupled, to the brake operation part outside the transmission case. The positional relationship of the cam operation arm and the side wall portion is set by the boss member to be a positional relationship in which a gap is formed between the cam operation arm and the side wall portion, and even if the inner surface of the side wall portion remains a cast surface, the cam operation arm swings smoothly without being adversely affected by the cast surface. The positional relationship between the brake operation part and the side wall portion is set by the boss member to be a positional relationship in which a gap is formed between the brake operation part and the side wall portion, and a member that is to be coupled to the brake operation part, such as an interlock rod, can be easily coupled thereto without coming into contact with the side wall portion.

Therefore, it is possible to achieve a tractor with which, even if the inner surface of the side wall portion remains a cast surface, the brake apparatus can be smoothly operated and work can be efficiently performed when an operation system is to be attached.

FIRST EMBODIMENT

The following describes an embodiment (a first embodiment), which is an example of the present invention, with reference to the drawings.

Figure 1:
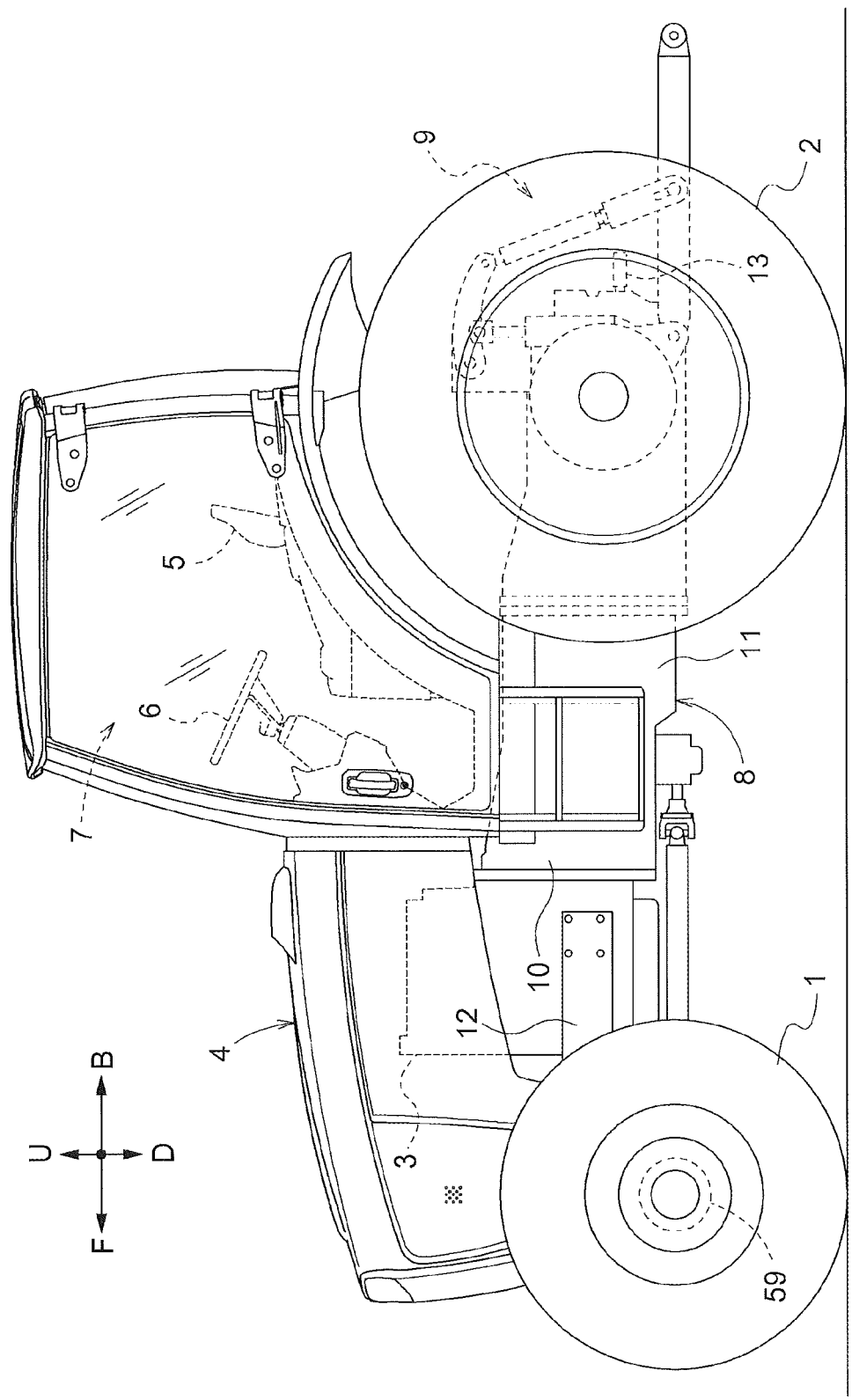
FIG. 1 is a diagram showing a first embodiment, and is a left side view showing an entire tractor.

In the following description, regarding the vehicle body of a tractor, the direction indicated by an arrow F in FIG. 1 is referred to as "forward of the vehicle body", the direction indicated by an arrow B is referred to as "rearward of the vehicle body", the direction indicated by an arrow U is referred to as "upward of the vehicle body", the direction indicated by an arrow D is referred to as "downward of the vehicle body", the direction toward the front side of the sheet of the drawing is referred to as "leftward of the vehicle body", and the direction toward the back side of the sheet of the drawing is referred to as "rightward of the vehicle body".

As shown in FIG. 1, the tractor has a vehicle body to which a pair of left and right front wheels 1 are installed as travel apparatuses so as to be drivable and steerable, and to which a pair of left and right rear wheels 2 are installed as travel apparatuses so as to be drivable. A prime mover part 4 that has an engine 3 is formed in a front portion of the vehicle body. A driver part 7 that has a driver's seat 5 and a steering wheel 6 for steering the front wheels 1 is formed in a rear portion of the vehicle body. A linkage mechanism 9 to which various work apparatuses can be coupled so as to be able to be lifted and lowered, is installed to a rear portion of a vehicle body frame 8. The vehicle body frame 8 is provided with the engine 3, a clutch housing 10 that is coupled to a rear portion of the engine 3, a transmission case 11 whose front portion is coupled to the clutch housing 10, and a front wheel support frame 12 that extends forward from the engine 3.

With the tractor, a ridable cultivating machine is formed when a plow (not shown) or a rotary cultivating apparatus (not shown) is coupled to the rear portion of the vehicle body via the linkage mechanism 9. A loader work machine is formed when a front loader apparatus (not shown) is coupled to the front portion of the vehicle body. In this way, various work machines are formed by coupling various work machines to the vehicle body. A power take-off shaft 13 that outputs power from the engine 3 to the coupled work apparatus is provided in a rear portion of a transmission case 11.

Figure 2:
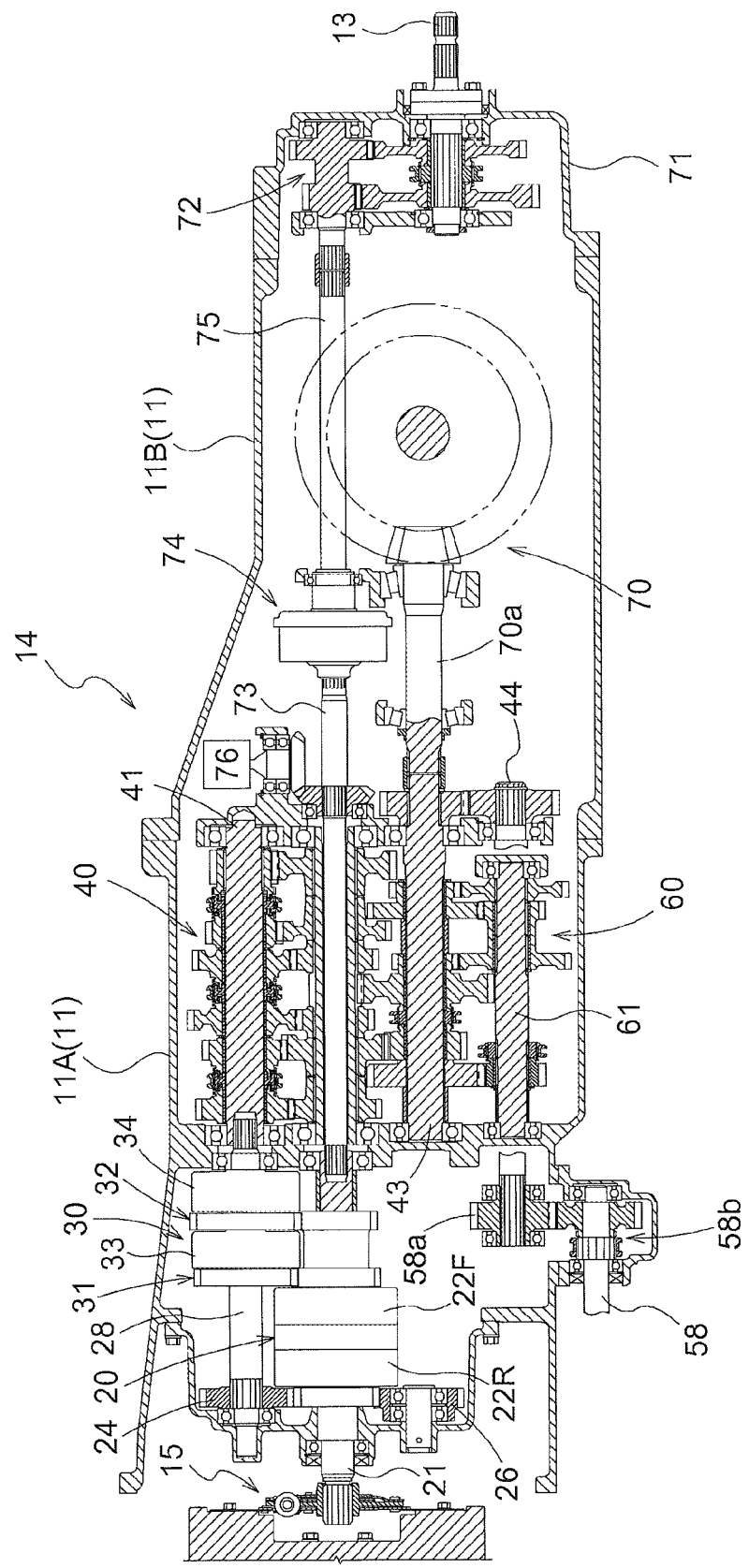
FIG. 2 is a diagram showing the first embodiment, and is a cross-sectional view showing a travel power transmission apparatus in an exploded state.

Configuration of Travel Power Transmission Apparatus According to First Embodiment A travel power transmission apparatus 14 that transmits power from the engine 3 to the front wheels 1 and the rear wheels 2 is configured as shown in FIG. 2. The travel power transmission apparatus 14 is provided with the transmission case 11. The travel power transmission apparatus 14 is installed such that the front-rear direction of the transmission case 11 coincides with the front-rear direction of the vehicle body and the top-bottom direction of the transmission case 11 coincides with the top-bottom direction of the vehicle body.

As shown in FIG. 2, the transmission case 11 houses: a forward/rearward travel switching apparatus 20 that converts power from the engine 3 (see FIG. 1) into forward travel power and rearward travel power; a high/low speed switching apparatus 30 that changes the speed of the forward travel power output from the forward/rearward travel switching apparatus 20 to two levels, namely a high speed and a low speed; a gear transmission 40 to which the rearward travel power output from the forward/rearward travel switching apparatus 20 and the forward travel power output from the high/low speed switching apparatus 30 are input; a creep speed changing apparatus 60 that changes the speed of power output from the gear transmission 40; a rear wheel differential mechanism 70 that transmits power output from the gear transmission 40 and power output from the creep speed changing apparatus 60 to the left and right rear wheels 2; and a front wheel power transmission shaft 44 that outputs power output from the gear transmission 40 and power output from the creep speed changing apparatus 60 to the left and right front wheels 1 (see FIG. 1).

The gear transmission 40 and the creep speed changing apparatus 60 are provided rearward of the forward/rearward travel switching apparatus 20 and the high/low speed switching apparatus 30. The rear wheel differential mechanism 70 is provided rearward of the gear transmission 40 and the creep speed changing apparatus 60.

As shown in FIG. 2, the transmission case 11 includes a front divisional transmission case 11A that houses the forward/rearward travel switching apparatus 20, the high/low speed switching apparatus 30, the gear transmission 40, the creep speed changing apparatus 60, and the front wheel power transmission shaft 44, and a rear divisional transmission case 11B that houses the rear wheel differential mechanism 70. A power take-off case 71 that supports the power take-off shaft 13 is detachably coupled to a rear portion of the rear divisional transmission case 11B. A work speed changing apparatus 72 that changes the speed of power from the engine 3 (see FIG. 1) and transmits the resulting power to the power take-off shaft 13 is housed in the power take-off case 71. Power from the engine 3 is input to the work speed changing apparatus 72 via a rotating shaft 73, a work clutch 74, and a rotating shaft 75. "76" shown in FIG. 2 indicates a hydraulic pump that is driven by power taken from the rotating shaft 73.

Figure 3:
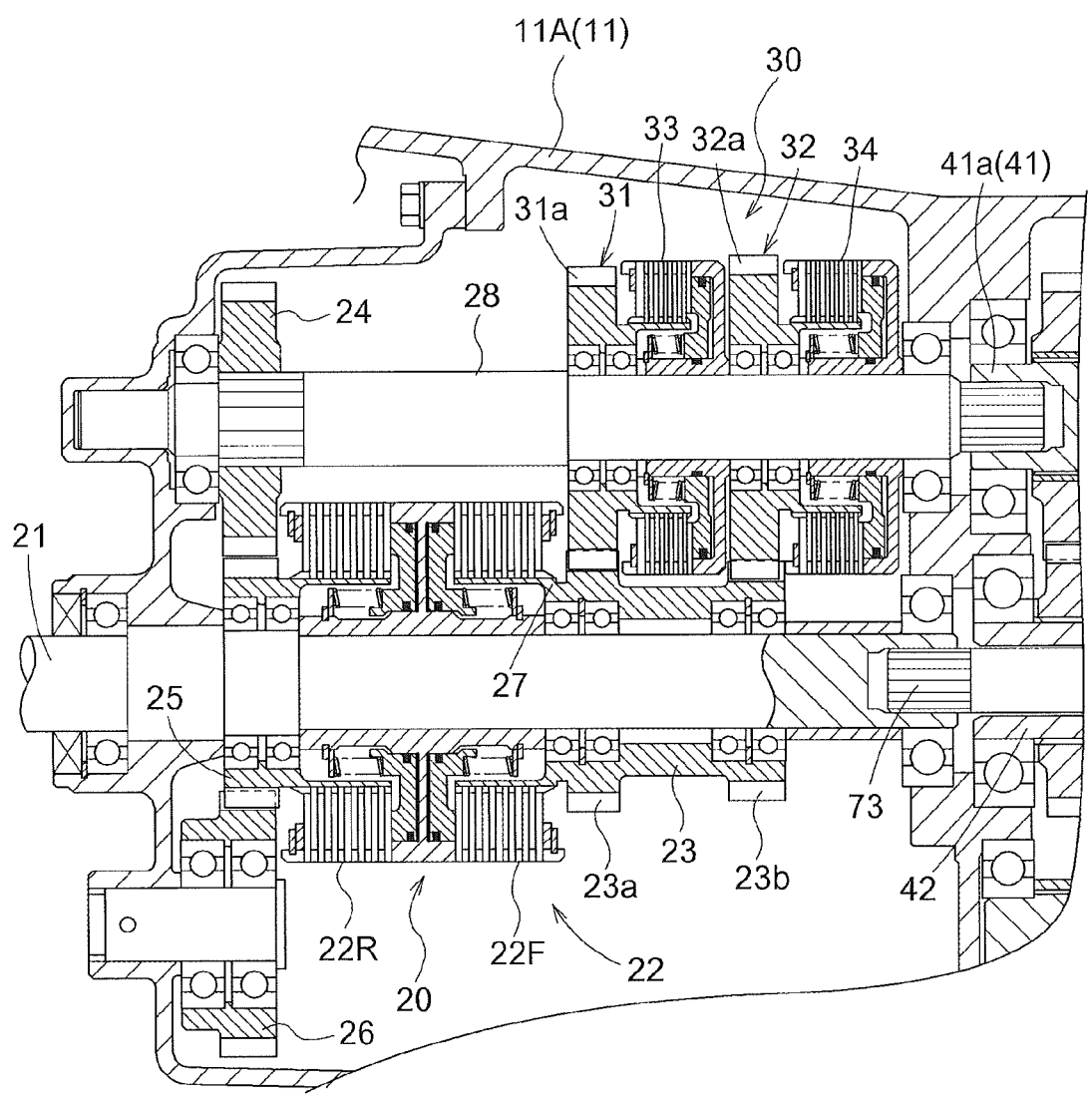
FIG. 3 is a diagram showing a first embodiment, and is a vertical cross-sectional side view showing a forward/rearward travel switching apparatus and a high/low speed switching apparatus.

Configuration of Forward/Rearward Travel Switching Apparatus According to First Embodiment As shown in FIGS. 2 and 3, the forward/rearward travel switching apparatus 20 includes: an input shaft 21 to which power from the engine 3 (see FIG. 1) is input via a primary clutch 15; a clutch unit 22 that is attached to the input shaft 21 and converts the power input to the input shaft 21 into forward travel power and rearward travel power; a forward travel output gear 23 that outputs the thus converted forward travel power, as a forward travel output unit; and a rearward travel output gear 24 that outputs the thus converted rearward travel power, as a rearward travel output unit.

In the present embodiment, the rearward travel output gear 24 is provided forward of the clutch unit 22, and the forward travel output gear 23 is provided rearward of the clutch unit 22. The present invention is not limited to such a configuration, and may be carried out with a configuration in which the rearward travel output gear 24 is provided rearward of the clutch unit 22 and the forward travel output gear 23 is provided forward of the clutch unit 22.

As shown in FIGS. 2 and 3, the clutch unit 22 includes a forward travel clutch 22F and a rearward travel clutch 22R that are attached to the input shaft 21. The forward travel clutch 22F is provided rearward of the rearward travel clutch 22R. A reverse gear 26 meshes with the output-side member 25 of the rearward travel clutch 22R and the rearward travel output gear 24. The rearward travel output gear 24 is interlocked with the output-side member 25 via the reverse gear 26. The forward travel output gear 23 is interlocked with an output-side member 27 of the forward travel clutch 22F. The forward travel output gear 23 and the output-side member 27 are interlocked with each other as a result of the forward travel output gear 23 and the output-side member 27 being formed integrally with each other.

In the present embodiment, the forward travel clutch 22F and the rearward travel clutch 22R are constituted by hydraulic control type wet multiple plate clutches. However, the present invention is not limited to such a configuration. A dry multiple plate clutch, a single plate clutch, a bite clutch, or the like may be employed as the forward travel clutch 22F and the rearward travel clutch 22R.

The forward/rearward travel switching apparatus 20 enters a forward travel power transmission state upon the forward travel clutch 22F being switched to an ON state, so that power from the input shaft 21 is transmitted to the forward travel output gear 23 by the forward travel clutch 22F, and is output from the forward travel output gear 23. The forward/rearward travel switching apparatus 20 enters a rearward travel power transmission state upon the rearward travel clutch 22R being switched to an ON state, so that power from the input shaft 21 is transmitted to the reverse gear 26 by the rearward travel clutch 22R, is transmitted from the reverse gear 26 to the rearward travel output gear 24, and is output from the rearward travel output gear 24.

A rotating power transmission shaft 28 that interlocks the rearward travel output gear 24 and an input shaft 41 with each other is provided so as to span the rearward travel output gear 24 and the input shaft 41, where the input shaft 41 serves as an input part of the gear transmission 40. The high/low speed switching apparatus 30 is provided so as to span the forward travel output gear 23 and the rotating power transmission shaft 28.

Upon the forward/rearward travel switching apparatus 20 being switched to a forward travel power transmission state, the clutch unit 22 transmits power from the input shaft 21 to the forward travel output gear 23, the forward travel output gear 23 converts the power into forward travel power, and the thus converted forward travel power is input from the forward travel output gear 23 to the high/low speed switching apparatus 30.

Upon the forward/rearward travel switching apparatus 20 being switched to a rearward travel power transmission state, the clutch unit 22 transmits power from the input shaft 21 to the reverse gear 26, the reverse gear 26 and the rearward travel output gear 24 convert the power into rearward travel power, and the thus converted rearward travel power is transmitted from the rearward travel output gear 24 to the rotating power transmission shaft 28. The rearward travel power output from the forward/rearward travel switching apparatus 20 is input to the gear transmission 40 by the rotating power transmission shaft 28. The rearward travel power output from the forward/rearward travel switching apparatus 20 is input without being subjected to speed change performed by the gear transmission 40.

Configuration of High/Low Speed Switching Apparatus According to First Embodiment As shown in FIGS. 2 and 3, the high/low speed switching apparatus 30 is provided so as to span the forward travel output gear 23 and the rotating power transmission shaft 28, and changes power from the forward travel output gear 23 to power of two different rotation speeds, and transmits the resulting power to the rotating power transmission shaft 28.

Specifically, as shown in FIGS. 2 and 3, the high/low speed switching apparatus 30 includes a pair of high speed-side gears 31 for a high-speed setting, which are provided so as to span the forward travel output gear 23 and the rotating power transmission shaft 28, and a pair of low speed-side gears 32 for a low-speed setting, which are provided so as to span the forward travel output gear 23 and the rotating power transmission shaft 28. The pair of high speed-side gears 31 are constituted by a large diameter-side gear portion 23a of a pair of gear portions 23a and 23b that are formed on the forward travel output gear 23, and a high-speed setting gear 31a that is supported by the rotating power transmission shaft 28 so as to be rotatable relative to the rotating power transmission shaft 28 while meshing with the large diameter-side gear portion 23a. The pair of low speed-side gears 32 is constituted by a small diameter-side gear portion 23b of the pair of gear portions 23a and 23b of the forward travel output gear 23, and a low-speed setting gear 32a that is supported by the rotating power transmission shaft 28 so as to be rotatable relative to the rotating power transmission shaft 28 while meshing with the small diameter-side gear portion 23b.

A high speed-side clutch 33 is provided so as to span the high-speed setting gear 31a and the rotating power transmission shaft 28. A low speed-side clutch 34 is provided so as to span the low-speed setting gear 32a and the rotating power transmission shaft 28. In the present embodiment, the high speed-side clutch 33 and the low speed-side clutch 34 are constituted by hydraulic control type wet multiple plate clutches. However, the present invention is not limited to such a configuration. A dry multiple plate clutch, a single plate clutch, a bite clutch, or the like may be employed as high speed-side clutch 33 and the low speed-side clutch 34.

The high/low speed switching apparatus 30 enters a high-speed power transmission state upon the high speed-side clutch 33 being switched to an ON state and the low speed-side clutch 34 being switched to an OFF state, and enters a low-speed power transmission state upon the high speed-side clutch 33 being switched to an OFF state and the low speed-side clutch 34 being switched to an ON state.

Upon the high/low speed switching apparatus 30 being switched to the high-speed power transmission state, the speed of the forward travel power of the forward travel output gear 23 is changed to the high-side speed by the pair of high speed-side gears 31, and the resulting power is transmitted to the rotating power transmission shaft 28 by the high speed-side clutch 33 and is input to the gear transmission 40 by the rotating power transmission shaft 28.

Upon the high/low speed switching apparatus 30 being switched to the low-speed power transmission state, the forward travel power of the forward travel output gear 23 is changed to the low-side speed by the pair of low speed-side gears 32, and the resulting power is transmitted to the rotating power transmission shaft 28 by the low speed-side clutch 34 and is input to the gear transmission 40 by the rotating power transmission shaft 28.

The rotation speed of the forward travel power when the high/low speed switching apparatus 30 is switched to the high-speed power transmission state and forward travel power is input to the gear transmission 40 is set to be the same as the rotation speed of the rearward travel power when the forward/rearward travel switching apparatus 20 is switched to the rearward travel power transmission state and rearward travel power is input to the gear transmission 40.

Configuration of Gear Transmission According to First Embodiment

Figure 4:
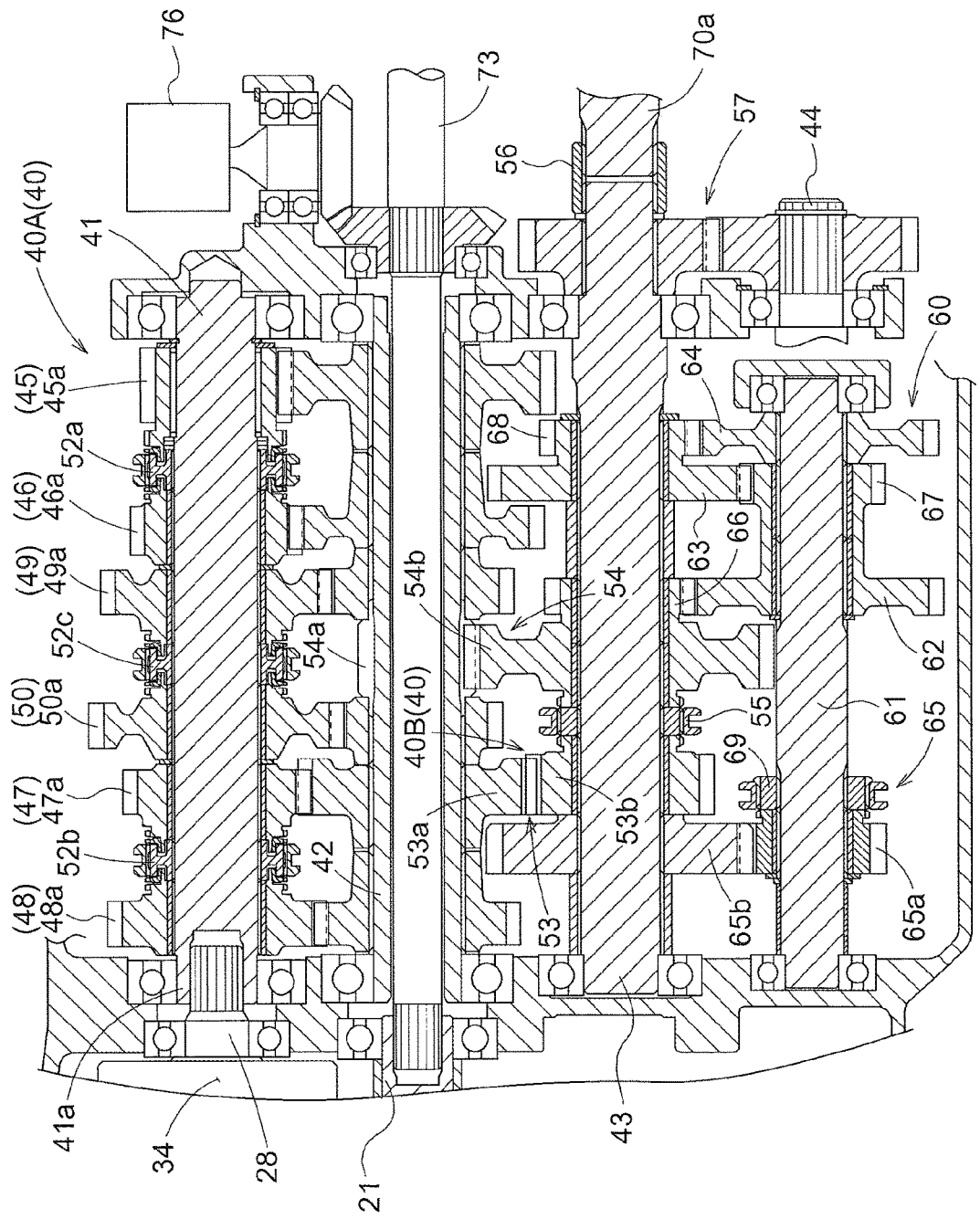
FIG. 4 is a diagram showing the first embodiment, and is a vertical cross-sectional side view showing a gear transmission and a creep speed changing apparatus.

As shown in FIG. 4, the gear transmission 40 includes: a primary speed changing unit 40A that changes power input from the rotating power transmission shaft 28 to speed-changed power at six levels from a first speed to a sixth speed; and an auxiliary speed changing unit 40B that changes power output from the primary speed changing unit 40A to speed-changed power at two levels, namely a high speed and a low speed, and outputs the speed-changed power to the rear wheel differential mechanism 70 and the front wheel power transmission shaft 44.

Figure 5:
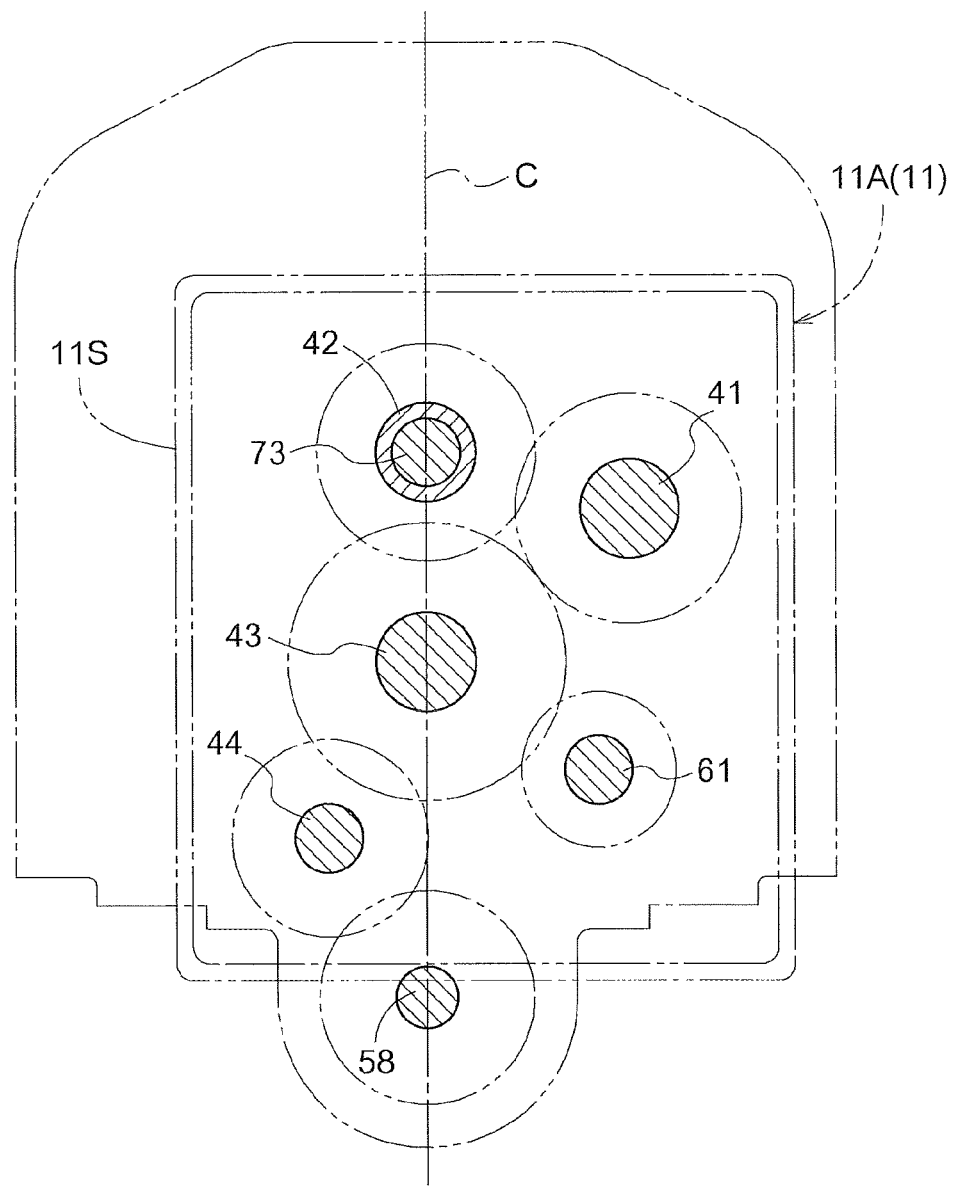
FIG. 5 is a diagram showing the first embodiment, and is a rear view showing an arrangement of a transmission relay shaft, an output shaft, a relay shaft, and a front wheel power transmission shaft.

Specifically, as shown in FIGS. 2 and 4, the gear transmission 40 includes: the input shaft 41 that serves as an input part that is interlocked with the rotating power transmission shaft 28; a cylindrical transmission relay shaft 42 that is provided in parallel with the input shaft 41; an output shaft 43 that is provided in parallel with the transmission relay shaft 42; and the front wheel power transmission shaft 44 that is provided in parallel with the output shaft 43. The rotating power transmission shaft 28 and the input shaft 41 are coaxially arranged in a straight line. The rotating power transmission shaft 28 and the input shaft 41 are interlocked with each other such that a front portion of the input shaft 41 is fitted onto, and engages with, a spline shaft portion that is provided on a rear portion of the rotating power transmission shaft 28. The transmission relay shaft 42 is fitted onto the rotating shaft 73 so as to be rotatable relative to the rotating shaft 73. The center line C shown in FIG. 5 indicates the center of the vehicle body in a left-right direction. As shown in FIG. 5, the transmission relay shaft 42 and the output shaft 43 are provided at the center of the vehicle body in a left-right direction. The transmission relay shaft 42 is provided at a position higher than the output shaft 43. The input shaft 41 is provided laterally outward of the transmission relay shaft 42 and the output shaft 43 with respect to the vehicle body. The input shaft 41 is provided at a position higher than the output shaft 43. The front wheel power transmission shaft 44 is provided laterally outward of the transmission relay shaft 42 and the output shaft 43 with respect to the vehicle body, on the opposite side to the input shaft 41. The front wheel power transmission shaft 44 is provided at a position lower than the output shaft 43.

As shown in FIG. 4, the primary speed changing unit 40A is provided so as to span the input shaft 41 and the transmission relay shaft 42, and changes power from the input shaft 41 to power of six different rotation speeds, namely a first speed to a sixth speed, and transmits the resulting power to the transmission relay shaft 42.

Specifically, as shown in FIG. 4, the primary speed changing unit 40A includes: a pair of first speed gears 45 to a pair of sixth speed gears 50 that are provided so as to span the input shaft 41 and the transmission relay shaft 42; and a first shift gear 52a, a second shift gear 52b, and a third shift gear 52c that are supported by the input shaft 41 so as not to be rotatable relative to the input shaft 41 but so as to be slidable along the input shaft 41. The pair of first speed gears 45 to the pair of sixth speed gears 50 respectively have input shaft gears 45a to 50a that are supported by the input shaft 41 so as to be rotatable relative to the input shaft 41. Upon the first shift gear 52a, the second shift gear 52b, or the third shift gear 52c engaging with a side portion of the input shaft gears 45a to 50a and the input shaft gears 45a to 50a being interlocked with the input shaft 41 via the first shift gear 52a, the second shift gear 52b, or the third shift gear 52c, the pair of first speed gears 45 to the pair of sixth speed gears 50 enter a speed-changing state in which the speed of power from the input shaft 41 is changed and the resulting power is transmitted to the transmission relay shaft 42. Upon the engagement of the first shift gear 52a, the second shift gear 52b, or the third shift gear 52c with the input shaft gears 45a to 50a being released and the interlocking of the input shaft gears 45a to 50a with the input shaft 41 being released, the pair of first speed gears 45 to the pair of sixth speed gears 50 enter a speed change cancel state.

As shown in FIG. 4, the auxiliary speed changing unit 40B is provided so as to span the transmission relay shaft 42 and the output shaft 43, and changes power from the transmission relay shaft 42 to power of two different rotation speeds, namely a high speed and a low speed, and transmits the resulting power to the output shaft 43, and from the output shaft 43 to the rear wheel differential mechanism 70 and the front wheel power transmission shaft 44.

Specifically, as shown in FIG. 4, the auxiliary speed changing unit 40B includes: a pair of high-speed setting gears 53 that are provided so as to span the transmission relay shaft 42 and the output shaft 43; a pair of low-speed setting gears 54 that are provided so as to span the transmission relay shaft 42 and the output shaft 43; and a fourth shift gear 55 that is supported by the output shaft 43 so as not to be rotatable relative to the output shaft 43 but so as to be slidable.

The pair of high-speed setting gears 53 includes a high-speed setting relay shaft gear 53a that is supported by the transmission relay shaft 42 so as not to be rotatable relative to the transmission relay shaft 42, and a high-speed setting output shaft gear 53b that is supported by the output shaft 43 so as to be rotatable relative to the output shaft 43 while meshing with the high-speed setting relay shaft gear 53a. The high-speed setting relay shaft gear 53a is supported by the transmission relay shaft 42 so as not to be rotatable relative to the transmission relay shaft 42, and is constituted by a relay shaft gear that constitutes the pair of third speed gears 47 of the primary speed changing unit 40A.

The pair of low-speed setting gears 54 includes a low-speed setting relay shaft gear 54a that is supported by the transmission relay shaft 42 so as not to be rotatable relative to the transmission relay shaft 42, and a low-speed setting output shaft gear 54b that is supported by the output shaft 43 so as to be rotatable relative to the output shaft 43 while meshing with the low-speed setting relay shaft gear 54a.

Upon the fourth shift gear 55 being slid to a high-speed ON position where the fourth shift gear 55 engages with a side portion of the high-speed setting output shaft gear 53b and is detached from the low-speed setting output shaft gear 54b, the auxiliary speed changing unit 40B enters a high-speed gear-shift state in which power from the transmission relay shaft 42 is transmitted to the output shaft 43 by the pair of high-speed setting gears 53. That is to say, the output shaft gear 53b enters a power transmission ON state in which the output shaft gear 53b is interlocked with the output shaft 43 by the fourth shift gear 55 and transmits power to the output shaft 43, and the output shaft gear 54b enters a power transmission OFF state in which interlocking with the output shaft 43 is released and power transmission to the output shaft 43 is disconnected.

Upon the fourth shift gear 55 being slid to a low-speed ON position where the fourth shift gear 55 is detached from the high-speed setting output shaft gear 53b and engages with a side portion of the low-speed setting output shaft gear 54b, the auxiliary speed changing unit 40B enters a low-speed gear-shift state in which power from the transmission relay shaft 42 is transmitted to the output shaft 43 by the pair of low-speed setting gears 54. That is to say, the output shaft gear 53b enters a power transmission OFF state in which interlocking with the output shaft 43 is released and power transmission to the output shaft 43 is disconnected, and the output shaft gear 54b enters a power transmission ON state in which the output shaft gear 54b is interlocked with the output shaft 43 by the fourth shift gear 55 and transmits power to the output shaft 43.

Upon the fourth shift gear 55 being slid to a neutral position at which the fourth shift gear 55 is detached from the high-speed setting output shaft gear 53b, and is detached from the low-speed setting output shaft gear 54b, the auxiliary speed changing unit 40B enters a neutral state in which power transmission from the transmission relay shaft 42 to the output shaft 43 is disconnected. That is to say, the output shaft gear 53b enters a power transmission OFF state in which interlocking with the output shaft 43 is released and power transmission to the output shaft 43 is disconnected, and the output shaft gear 54b enters a power transmission OFF state in which interlocking with the output shaft 43 is released and power transmission to the output shaft 43 is disconnected. By being shifted to the neutral state, the auxiliary speed changing unit 40B activates the speed changing effect of the creep speed changing apparatus 60.

As shown in FIGS. 2 and 4, a rear portion of the output shaft 43 and a front portion of an input shaft 70a of the differential mechanism 70 are interlocked with each other via a connection member 56. A gear interlock mechanism 57 is provided, which spans between a rear portion of the output shaft 43 and a rear portion of the front wheel power transmission shaft 44 and transmits power from the output shaft 43 to the front wheel power transmission shaft 44.

In the gear transmission 40, power input to the input shaft 41 by the rotating power transmission shaft 28 is transmitted to the transmission relay shaft 42 after being subjected to primary speed change performed by a pair of gears that have been brought into a speed-changing state, of the pair of first speed gears 45 to the pair of sixth speed gears 50, and is subjected to auxiliary speed change performed by the auxiliary speed changing unit 40B that has been switched to a high-speed gear-shift state or a low-speed gear-shifting state and is transmitted to the output shaft 43, and is transmitted from the output shaft 43 to the rear wheel differential mechanism 70 and the front wheel power transmission shaft 44. The power transmitted to the front wheel power transmission shaft 44 is input to a front wheel drive case 59 (see FIG. 1) by a rotation shaft 58 that is interlocked with a front portion of the front wheel power transmission shaft 44 via a front wheel acceleration mechanism 58a and a front wheel power transmission clutch 58b as shown in FIG. 2, and is transmitted to the left and right front wheels 1 via a front wheel differential mechanism (not shown) that is housed in the front wheel drive case 59, and so on.

Configuration of Creep Speed Changing Apparatus According to First Embodiment

As shown in FIGS. 2 and 4, the creep speed changing apparatus 60 includes the output shaft 43, and a creep shaft 61 that that is provided in parallel with the output shaft 43 and serves as a relay shaft. As shown in FIG. 5, the creep shaft 61 is provided laterally outward of the transmission relay shaft 42 and the output shaft 43 with respect to the vehicle body, on the same side as the input shaft 41. The creep shaft 61 is provided at a position lower than the output shaft 43.

As shown in FIG. 4, a first deceleration gear 62 is supported by the creep shaft 61 so as to be rotatable relative to the creep shaft 61. The first deceleration gear 62 meshes with a first power transmission gear 66 that is provided on a side portion of the output shaft gear 54b so as not to be rotatable relative to the output shaft gear 54b. The outer diameter of the first deceleration gear 62 is formed to be larger than the outer diameter of the first power transmission gear 66. Power from the output shaft gear 54b is transmitted to the first deceleration gear 62 by the first power transmission gear 66 that rotates together with the output shaft gear 54b, and the first deceleration gear 62 rotates. Power from the output shaft gear 54b is decelerated and transmitted to the first deceleration gear 62.

A second deceleration gear 63 is supported by the output shaft 43 so as to be rotatable relative to the output shaft 43. The second deceleration gear 63 meshes with a second power transmission gear 67 that is provided on a side portion of the first deceleration gear 62 so as not to be rotatable relative to the first deceleration gear 62. The outer diameter of the second deceleration gear 63 is formed to be larger than the outer diameter of the second power transmission gear 67. Power from the first deceleration gear 62 is transmitted to the second deceleration gear 63 by the second power transmission gear 67 that rotates together with the first deceleration gear 62, and the second deceleration gear 63 rotates. Power from the first deceleration gear 62 is decelerated and transmitted to the second deceleration gear 63.

A third deceleration gear 64 is supported by the creep shaft 61 so as not to be rotatable relative to the creep shaft 61. The third deceleration gear 64 meshes with a third power transmission gear 68 that is provided on a side portion of the second deceleration gear 63 so as not to be rotatable relative to the second deceleration gear 63. The outer diameter of the third deceleration gear 64 is formed to be larger than the outer diameter of the third power transmission gear 68. Power from the second deceleration gear 63 is transmitted to the third deceleration gear 64 by the third power transmission gear 68 that rotates together with the second deceleration gear 63 and the third deceleration gear 64 rotates, and the creep shaft 61 is rotated by the third deceleration gear 64. Power from the second deceleration gear 63 is decelerated and transmitted to the creep shaft 61 by the third deceleration gear 64.

A pair of deceleration gears 65 are provided so as to span the creep shaft 61 and the output shaft 43. The pair of deceleration gears 65 is provided on the opposite side to the first deceleration gear 62 with respect to the output shaft gear 54b in the direction in which the axis of the creep shaft 61 extends. The pair of deceleration gears 65 includes a power transmission gear 65a that is supported by the creep shaft 61 so as to be rotatable relative to the creep shaft 61, and an output shaft deceleration gear 65b that is supported by the output shaft 43 so as not to be rotatable relative to the output shaft 43 while meshing with the power transmission gear 65a. The outer diameter of the output shaft deceleration gear 65b is formed to be larger than the outer diameter of the power transmission gear 65a.

A shift gear 69 that serves as a clutch is provided between the power transmission gear 65a and the creep shaft 61. The shift gear 69 is supported by the creep shaft 61 so as not to be rotatable relative to the creep shaft 61 but so as to be slidable.

Upon the shift gear 69 being slid to an ON position at which the shift gear 69 engages with a side portion of the power transmission gear 65a, the power transmission gear 65a is coupled to the creep shaft 61 by the shift gear 69 so as not to be rotatable relative to the creep shaft 61, thus causing the pair of deceleration gears 65 to enter a power transmission ON state, and power from the creep shaft 61 is decelerated and transmitted to the output shaft 43 by the power transmission gear 65a and the output shaft deceleration gear 65b.

Upon the shift gear 69 being slid to an OFF position at which the shift gear 69 is disengaged from the power transmission gear 65a, the power transmission gear 65a is decoupled from the creep shaft 61 and the pair of deceleration gears 65 enter a power transmission OFF state, and power from the creep shaft 61 is prevented from being transmitted to the output shaft 43.

The present embodiment employs a configuration in which the pair of deceleration gears 65 can be switched to a power transmission ON state and a power transmission OFF state by employing a configuration in which the power transmission gear 65a is switched to the state of being coupled to the creep shaft 61 and the state of being decoupled from the creep shaft 61. However, the present invention is not limited to such a configuration. It is possible to employ a configuration in which the pair of deceleration gears 65 can be switched to a power transmission ON state and a power transmission OFF state by employing a configuration in which the power transmission gear 65a is supported by the creep shaft 61 so as not to be rotatable relative to the creep shaft 61, the output shaft deceleration gear 65b is supported by the output shaft 43 so as to be rotatable relative to the output shaft 43, and a clutch that can switch the output shaft deceleration gear 65b to the state of being coupled to the output shaft 43 and the state of being decoupled from the output shaft 43. The clutch is not limited to the shift gear 69, and a friction clutch, a bite clutch, or the like may be employed.

In the creep speed changing apparatus 60, upon the pair of deceleration gears 65 being shifted to a power transmission ON state, the creep shaft 61 and the output shaft 43 are interlocked with each other via the pair of deceleration gears 65 and the shift gear 69 and enter a speed change ON state, power from the output shaft gear 54b is transmitted to the first deceleration gear 62 by the first power transmission gear 66, power from the first deceleration gear 62 is transmitted the second deceleration gear 63 by the second power transmission gear 67, power from the second deceleration gear 63 is transmitted to the third deceleration gear 64 by the third power transmission gear 68, the creep shaft 61 is driven by the third deceleration gear 64, and power from the creep shaft 61 is transmitted to the output shaft 43 by the pair of deceleration gears 65. That is to say, power from the output shaft gear 54b is decelerated through first-stage deceleration performed by the first deceleration gear 62, second-stage deceleration performed by the second deceleration gear 63, third-stage deceleration performed by the third deceleration gear 64, and fourth-stage deceleration performed by the pair of deceleration gears 65, and is transmitted to the output shaft 43.

Upon the pair of deceleration gears 65 being switched to a power transmission OFF state, the interlocking of the creep shaft 61 and the output shaft 43 is released, and the creep speed changing apparatus 60 enters a speed change OFF state, and the power transmitted by the fourth shift gear 55 from the output shaft gear 53b and the output shaft gear 54b to the output shaft 43 is enabled to be directly transmitted from the output shaft 43 to the input shaft 70a of the differential mechanism 70.

In the travel power transmission apparatus 14, upon the forward/rearward travel switching apparatus 20 being switched to the forward travel power transmission state, power from the engine 3 is converted by the forward/rearward travel switching apparatus 20 into forward travel power, the thus converted forward travel power is input to the high/low speed switching apparatus 30 and the speed thereof is changed to the low-side speed or the high-side speed, and the forward travel power of the low-side speed or the high-side speed resulting from the speed change is input to the gear transmission 40 by the rotating power transmission shaft 28 and the input shaft 41. Upon the forward/rearward travel switching apparatus 20 being switched to the rearward travel power transmission state, power from the engine 3 is converted into rearward travel power by the forward/rearward travel switching apparatus 20, and the thus converted rearward travel power is input to the gear transmission 40 by the rotating power transmission shaft 28 and the input shaft 41. The forward travel power or rearward travel power input to the gear transmission 40 is transmitted to the output shaft 43 via the primary speed changing unit 40A and the auxiliary speed changing unit 40B, is input from the output shaft 43 to the rear wheel differential mechanism 70, and is transmitted to the left and right rear wheels 2. At the same time, the power is transmitted from the output shaft 43 to the front wheel power transmission shaft 44, is input from the front wheel power transmission shaft 44 to the front wheel drive case 59, and is transmitted to the left and right front wheels 1.

Therefore, when loader work is to be performed, for example, it is possible to switch the front wheels 1 and the rear wheels 2 to forward travel and rearward travel to travel forward and rearward by simply switching the forward/rearward travel switching apparatus 20 to the forward travel power transmission state and the rearward travel power transmission state. If the high/low speed switching apparatus 30 is switched to the high-speed power transmission state, the rotation speed of rearward travel power input to the gear transmission 40 by the rotating power transmission shaft 28 and the input shaft 41 when the forward/rearward travel switching apparatus 20 is switched to the rearward travel power transmission state is the same as the rotation speed of the forward travel power input to the gear transmission 40 by the rotating power transmission shaft 28 and the input shaft 41 when the forward/rearward travel switching apparatus 20 is switched to the forward travel power transmission state, and forward travel and rearward travel can be performed at the same travel speed.

To perform normal travel, for example, the creep speed changing apparatus 60 is switched to a speed change OFF state. As a result, the power input to the gear transmission 40 is subjected to primary speed change performed by the primary speed changing unit 40A, and is also subjected to auxiliary speed change performed by the auxiliary speed changing unit 40B. The resulting power is transmitted to the output shaft 43, and is transmitted to the front wheels 1 and the rear wheels 2 without being subjected to speed change performed by the creep speed changing apparatus 60.

When plow work is to be performed, for example, the auxiliary speed changing unit 40B is switched to a neutral state, and the creep speed changing apparatus 60 is switched to a speed change ON state. As a result, the power input to the gear transmission 40 and subjected to the speed change performed by the primary speed changing unit 40A is input from the low-speed setting output shaft gear 54b of the auxiliary speed changing unit 40B to the creep speed changing apparatus 60 by the first power transmission gear 66, is subjected to creep speed change in the creep speed changing apparatus 60 through four-stage deceleration, namely deceleration performed by the first deceleration gear 62, deceleration performed by the second deceleration gear 63, deceleration performed by the third deceleration gear 64, and deceleration performed by the pair of deceleration gears 65 and is transmitted to the output shaft 43. The power is transmitted from the output shaft 43 to the rear wheel differential mechanism 70 and the front wheel power transmission shaft 44, and thus the front wheels 1 and the rear wheels 2 can be driven at a low speed. In the present embodiment, the tractor can travel at approximately 0.2 Km/h.

In the present embodiment, as shown in FIG. 5, the creep shaft 61 is provided on the same side as the input shaft 41 with respect to the center line C, and the front wheel power transmission shaft 44 is located on the opposite side to the input shaft 41 with respect to the center line C. The interval between the creep shaft 61 and the center line C needs to be larger than the distance between the front wheel power transmission shaft 44 and the center line C is. Therefore, it is possible to reduce the distance between the gears supported by the output shaft 43 and a side wall portion 11S of the transmission case 11 by providing the front wheel power transmission shaft 44 on the opposite side to the input shaft 41 with respect to the center line C, compared to providing the creep shaft 61 on the opposite side to the input shaft 41 with respect to the center line C. The smaller the interval between the gears and the side wall portion 11S, the more likely the lubricant oil in the transmission case is stirred by the rotating gears, and the more likely the lubricant oil reaches the gears of the transmission relay shaft 42 and the input shaft 41 that are located at higher positions than the output shaft 43. Therefore, according to the present embodiment, it is possible to make it easier for lubricant oil to spread throughout the gear transmission 40 while keeping the oil surface level in the transmission case as low as possible.

Figure 6:
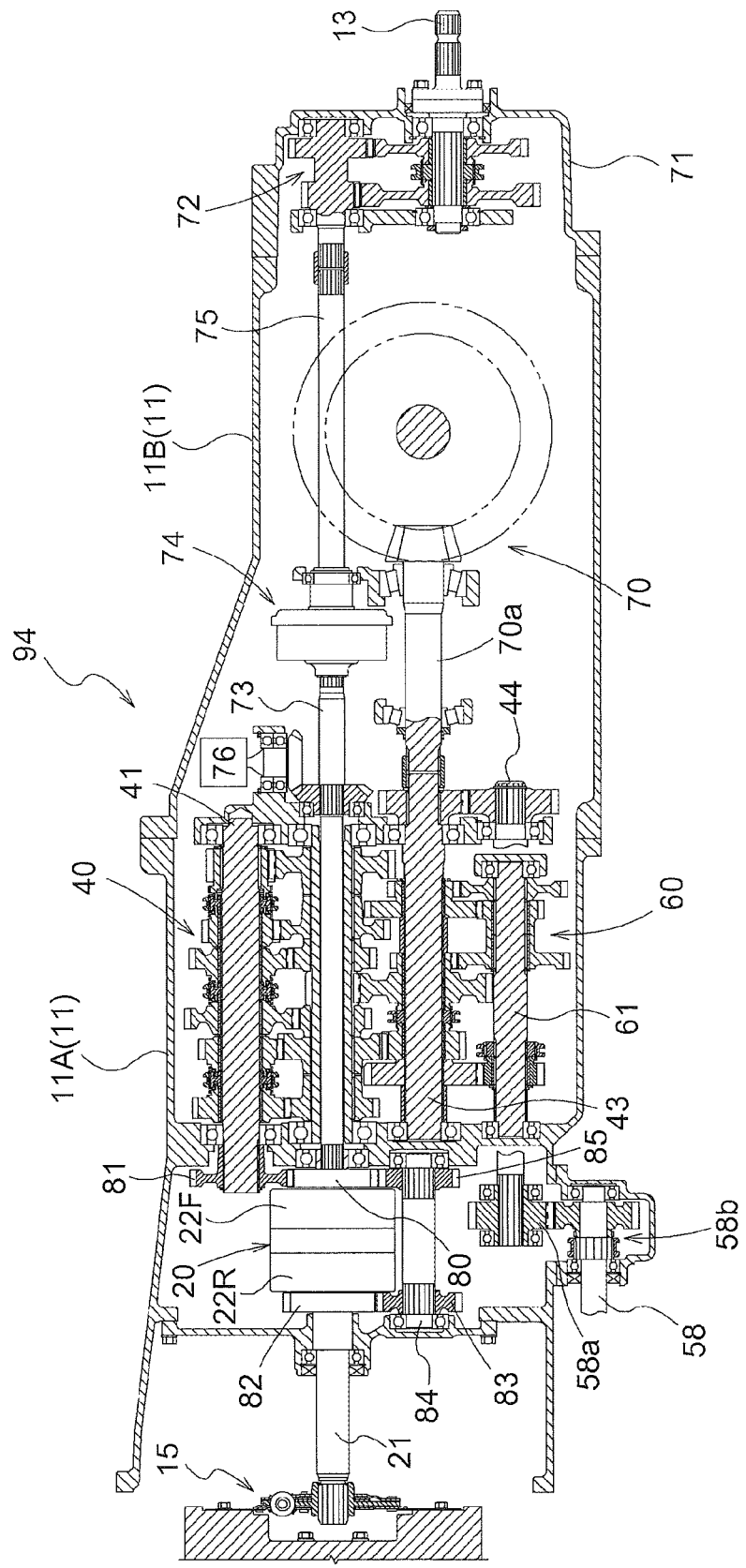
FIG. 6 is a diagram showing the first embodiment, and is a cross-sectional view showing a travel power transmission apparatus with another implementation structure in an exploded state.

Variation of First Embodiment (1) FIG. 6 is a vertical cross-sectional side view showing a travel power transmission apparatus 94 that is a variation of the embodiment. The high/low speed switching apparatus 30 is omitted from the travel power transmission apparatus 94 that is a variation of the embodiment.

In the forward/rearward travel switching apparatus 20 provided in the travel power transmission apparatus 94, upon the forward travel clutch 22F being switched to an ON state, power from the input shaft 21 is transmitted to the input shaft 41 of the gear transmission 40 via the forward travel clutch 22F, a clutch output gear 80, and an input gear 81. Upon the rearward travel clutch 22R being switched to an ON state, power from the input shaft 21 is transmitted to the input shaft 41 of the gear transmission 40 via the rearward travel clutch 22R, a clutch output gear 82, a reverse gear 83, a rotation shaft 84, a power transmission gear 85, and the input gear 81.

(2) In the travel power transmission apparatus 14 shown in FIG. 2 and the travel power transmission apparatus 94 shown in FIG. 6, the forward/rearward travel switching apparatus 20 is provided outside the gear transmission 40. However, the gear transmission 40 may be provide with the function of switching to forward travel and rearward travel.

(3) The above-described embodiment shows an example in which the pair of deceleration gears 65 is located on the opposite side to the first deceleration gear 62 with respect to the output shaft gear 54*b*. However, the present invention may be carried out with a configuration in which the pair of deceleration gears 65 is provided on the same side as the first deceleration gear 62 with respect to the output shaft gear 54*b*.

Second Embodiment

The following describes an embodiment (a second embodiment), which is an example of the present invention, with reference to the drawings.

Figure 7:
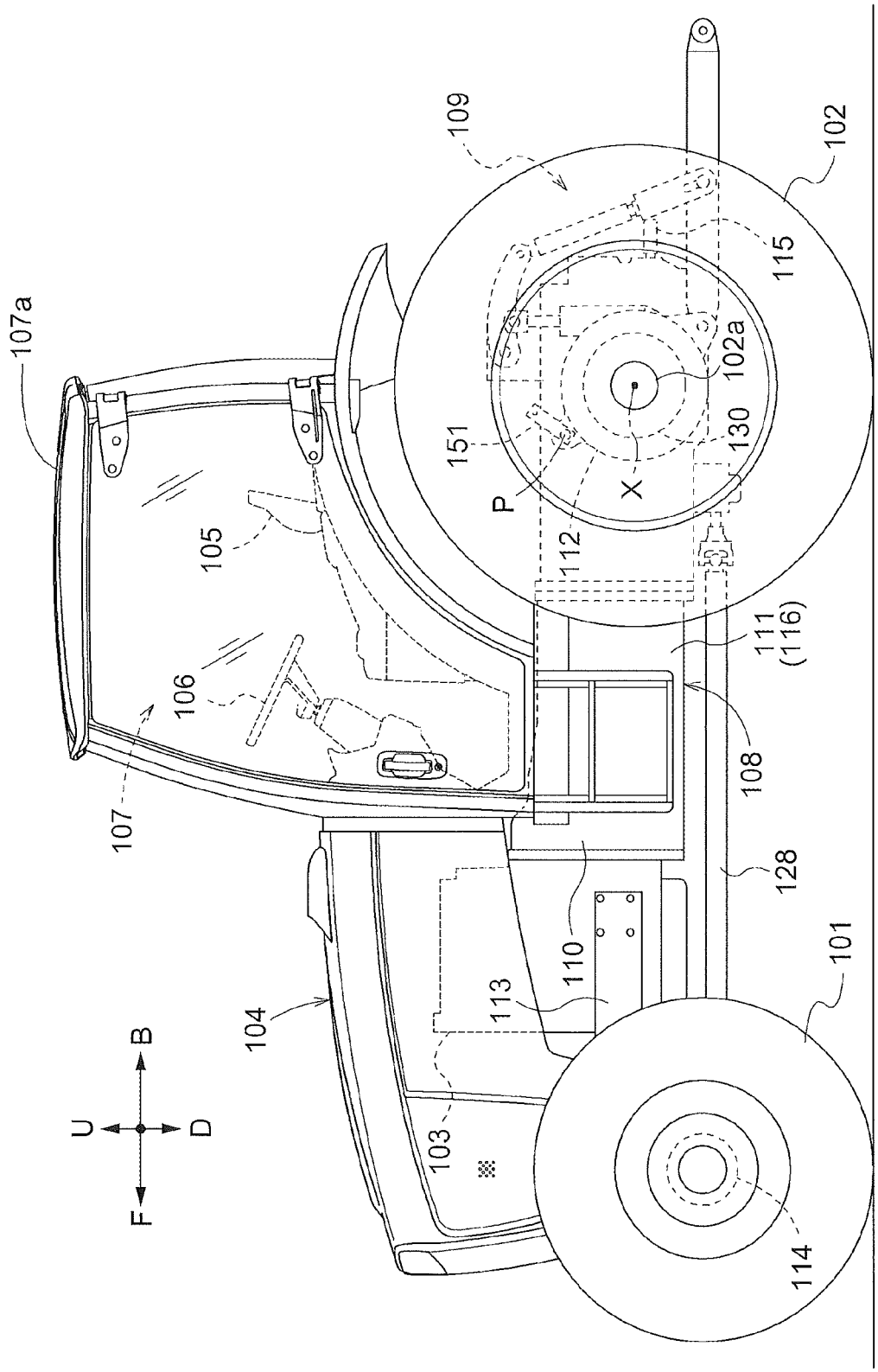
FIG. 7 is a diagram showing a second embodiment, and is a left side view showing an entire tractor.

In the following description, regarding the vehicle body of a tractor, the direction indicated by an arrow F in FIG. 7 is referred to as "forward of the vehicle body", the direction indicated by an arrow B is referred to as "rearward of the vehicle body", the direction indicated by an arrow U is referred to as "upward of the vehicle body", the direction indicated by an arrow D is referred to as "downward of the vehicle body", the direction toward the front side of the sheet of the drawing is referred to as "leftward of the vehicle body", and the direction toward the back side of the sheet of the drawing is referred to as "rightward of the vehicle body".

Overall Configuration of Tractor According to Second Embodiment

As shown in FIG. 7, the tractor has a vehicle body to which a pair of left and right front wheels 101 are installed as travel apparatuses so as to be drivable and steerable, and to which a pair of left and right rear wheels 102 are installed as travel apparatuses so as to be drivable. A prime mover part 104 that has an engine 103 is formed in a front portion of the vehicle body. A driver part 107 that has a driver's seat 105 and a steering wheel 106 for steering the front wheels 101 is formed in a rear portion of the vehicle body. The driver part 107 is provided with a cabin 107*a* that covers a boarding space. A linkage mechanism 109 to which various work apparatuses can be coupled so as to be able to be lifted and lowered, is installed to a rear portion of a vehicle body frame 108.

The vehicle body frame 108 is provided with the engine 103, a clutch housing 110 that is coupled to a rear portion of the engine 103, a transmission case 111 whose front portion is coupled to the clutch housing 110, a left axle case 112 that extends outward to the left from a rear portion of the transmission case 111 and supports the left rear wheel 102 so as to be rotatable, a right axle case 112 that extends outward to the right from a rear portion of the transmission case 111 and supports the right rear wheel 102 so as to be rotatable, and a front wheel support frame 113 that extends forward from the engine 103 and supports the left and right front wheels 101. The front wheel support frame 113 uses a front wheel drive case 114 to support the left and right front wheels 101.

With the tractor, a ridable cultivating machine is formed when a plow (not shown) or a rotary cultivating apparatus (not shown) is coupled to the rear portion of the vehicle body via the linkage mechanism 109. A loader work machine is formed when a front loader apparatus (not shown) is coupled to the front portion of the vehicle body. In this way, various work machines are formed by coupling various work machines to the vehicle body. Power from the engine 103 can be taken from a power take-off shaft 115 that is provided on a rear portion of the transmission case 111, and transmitted to a work apparatus that is coupled to a rear portion of the vehicle body.

Figure 8:
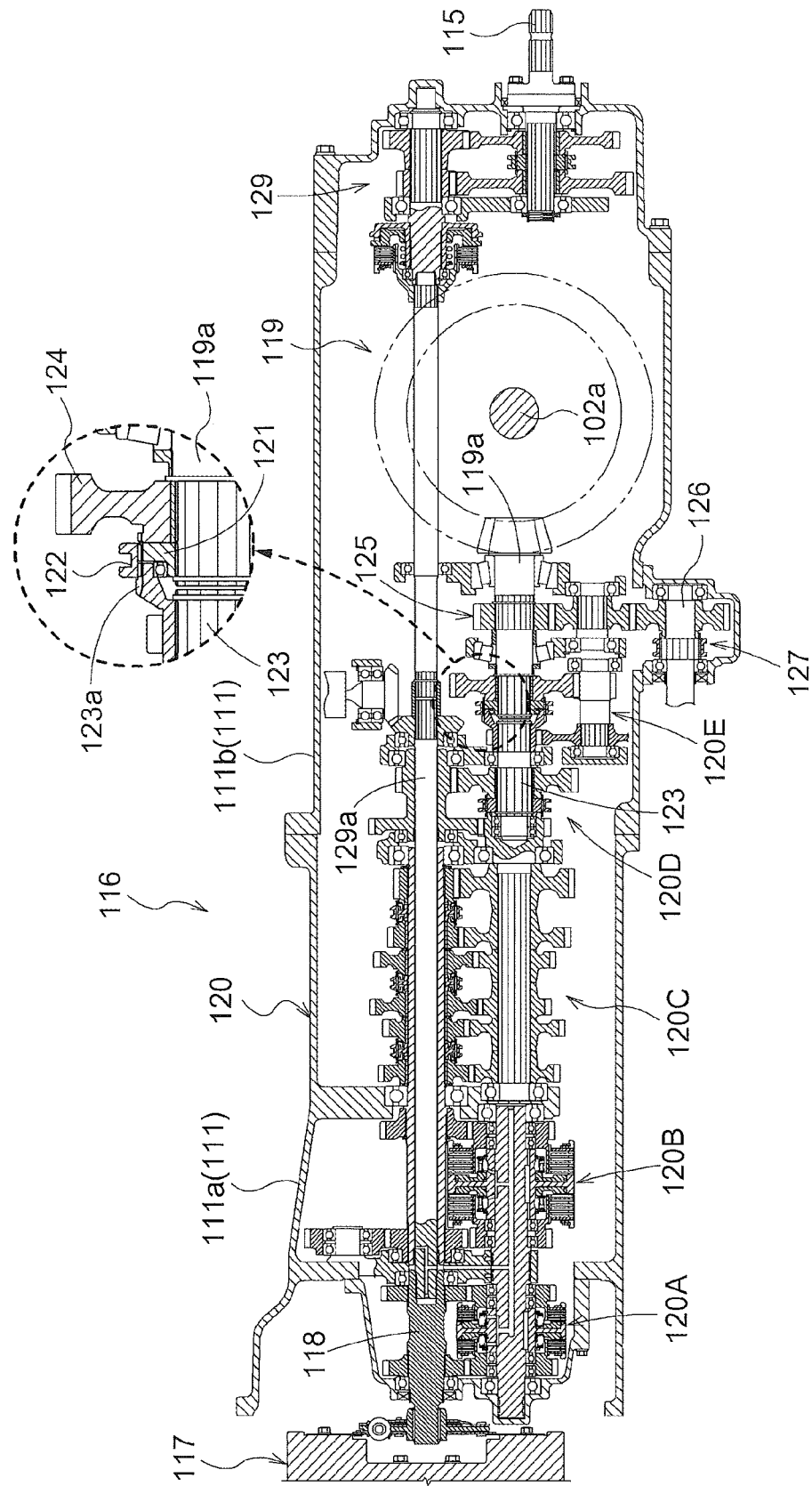
FIG. 8 is a diagram showing the second embodiment, and is a vertical cross-sectional side view showing a travel power transmission apparatus.

Configuration of Travel Power Transmission Apparatus According to Second Embodiment A travel power transmission apparatus 116 that transmits power from the engine 103 to the front wheels 101 and the rear wheels 102 is configured as shown in FIG. 8. The travel power transmission apparatus 116 is provided with the transmission case 111. The travel power transmission apparatus 116 is installed such that the front-rear direction of the transmission case 111 coincides with the front-rear direction of the vehicle body and the top-bottom direction of the transmission case 111 coincides with the top-bottom direction of the vehicle body. The transmission case 111 is configured to be dividable into a front divisional transmission case 111*a* and a rear divisional transmission case 111*b*.

A power transmission apparatus input shaft 118 to which power from the engine 103 (see FIG. 7) is transmitted via a primary clutch 117 is supported in a front portion of the transmission case 111 so as to be rotatable. A rear portion of the transmission case 111 houses a differential mechanism 119 that transmits power to left rear and right rear axles 102*a*. A transmission 120 that changes the speed of the power transmitted to the power transmission apparatus input shaft 118 and transmits resulting power to the differential mechanism 119 is provided so as to span the space in a front portion and the space in a rear portion of the transmission case 111.

As shown in FIG. 8, the transmission 120 is provided with: a high/low speed switching apparatus 120A that changes the power transmitted to the power transmission apparatus input shaft 118 to power of the high-side speed and power of the low-side speed; a forward/rearward travel switching apparatus 120B that converts the power of the high-side speed and the power of the low-side speed output from the high/low speed switching apparatus 120A to forward travel power and rearward travel power; a speed changing apparatus 120C that performs primary speed change to change the forward travel power and rearward travel power output from the forward/rearward travel switching apparatus 120B to speed-changed power of a plurality of different rotation speeds; an auxiliary speed changing apparatus 120D that performs auxiliary speed change to change the power output from the speed changing apparatus 120C to speed-changed power of two different rotation speeds, namely a high speed and a low speed; and a creep speed changing apparatus 120E that performs creep speed change on the power output from the auxiliary speed changing apparatus 120D. According to the present embodiment, the speed changing apparatus 120C is configured to be able to perform speed change at six levels from a first speed to a sixth speed. The present invention is not limited to such a configuration, and a speed changing apparatus that can perform speed change at five or less levels, or seven or more levels may be employed.

As shown in FIG. 8, a shift gear 122 is supported by a support portion 121 that is formed on a differential mechanism input shaft 119*a* of the differential mechanism 119, so as not to be rotatable relative to the support portion 121 but so as to be slidable. A gear portion 123*a* is formed on a rear portion of an auxiliary speed changing output shaft 123 of the auxiliary speed changing apparatus 120D. A second creep gear 124 of the creep speed changing apparatus 120E is supported by the differential mechanism input shaft 119*a* so as to be rotatable relative to the differential mechanism input shaft 119*a*. Upon the shift gear 122 engaging with both the support portion 121 and the gear portion 123*a*, the shift gear 122 disengages from the second creep gear 124, the auxiliary speed changing output shaft 123 and the differential mechanism input shaft 119*a* are interlocked with each other via the shift gear 122, and power from the auxiliary speed changing output shaft 123 is input to the differential mechanism 119 without being subjected to speed change. Upon the shift gear 122 engaging the support portion 121 and a side portion of the second creep gear 124, the shift gear 122 disengages from the gear portion 123*a*, the second creep gear 124 and the differential mechanism input shaft 119*a* are interlocked with each other via the shift gear 122, and power from the auxiliary speed changing output shaft 123 is subjected to creep speed change performed by the creep speed changing apparatus 120E and the resulting power is input to the differential mechanism 119.

Power from the differential mechanism input shaft 119*a* is transmitted to a front wheel output shaft 126 via a gear mechanism 125, and power from the front wheel output shaft 126 is input to the front wheel drive case 114 (see FIG. 7) via a front wheel clutch 127 and a front wheel power transmission shaft 128 (see FIG. 7).

"129" shown in FIG. 8 indicates a work speed changing apparatus. Power from the power transmission apparatus input shaft 118 is input to the work speed changing apparatus 129 via a rotation shaft 129*a*, and the work speed changing apparatus 129 performs speed change on the input power and transmits the resulting power to the power take-off shaft 115.

Configuration of Brake Apparatus According to Second Embodiment

As shown in FIG. 7, a left brake apparatus 130 that performs a braking action on the left rear wheel 102 and a right brake apparatus 130 that performs a braking action on the right rear wheel 102 are provided on a rear portion of the vehicle body frame 108. The left brake apparatus 130 and the right brake apparatus 130 have different configurations in that the left brake apparatus 130 is provided on a left side portion of the vehicle body frame 108 and the right brake apparatus 130 is provided on a right side portion of the vehicle body frame 108, but otherwise have the same configuration. The following only describes the left brake apparatus 130.

Figure 9:
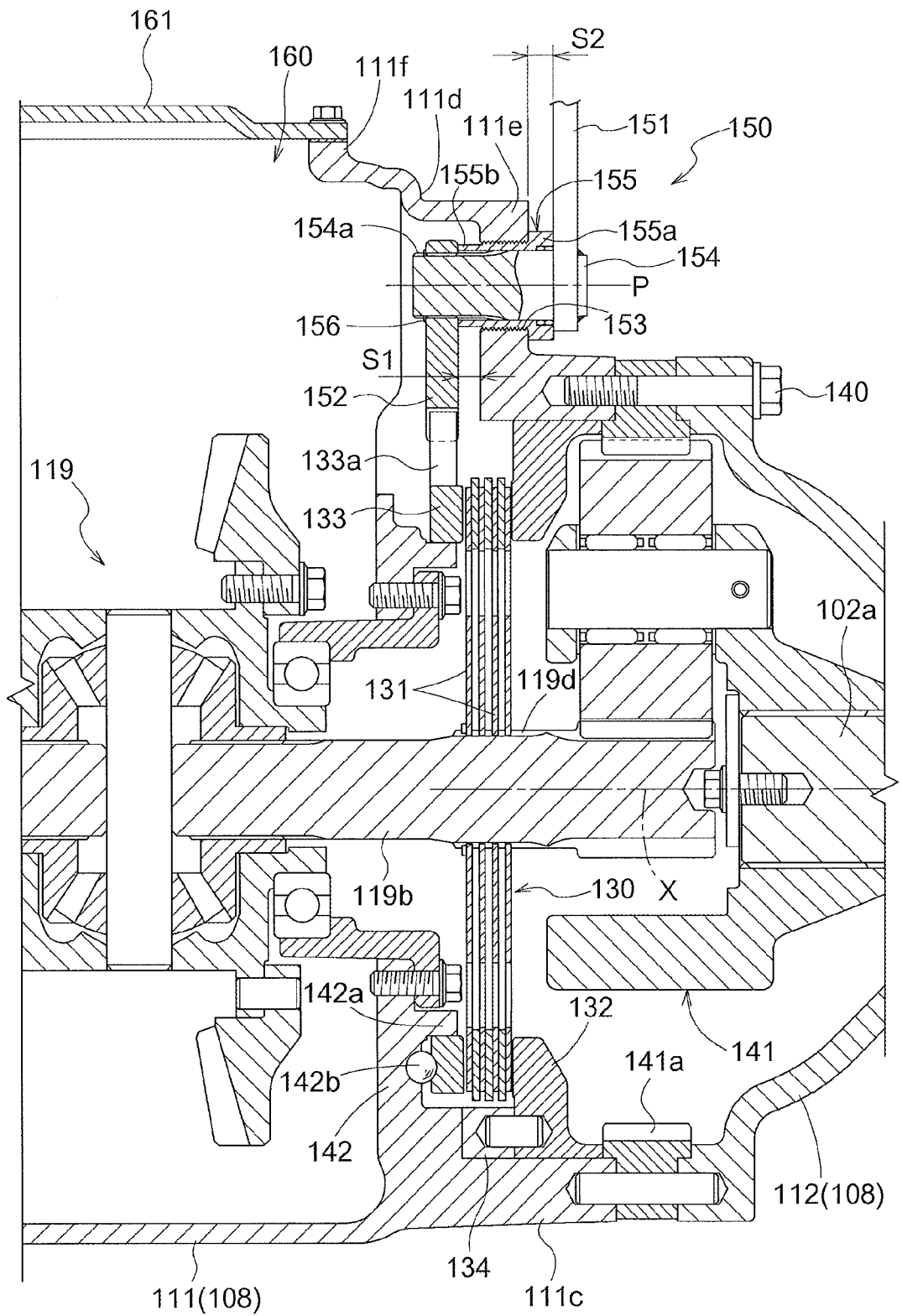
FIG. 9 is a diagram showing the second embodiment, and is a vertical cross-sectional front view showing a brake apparatus.
Figure 10:
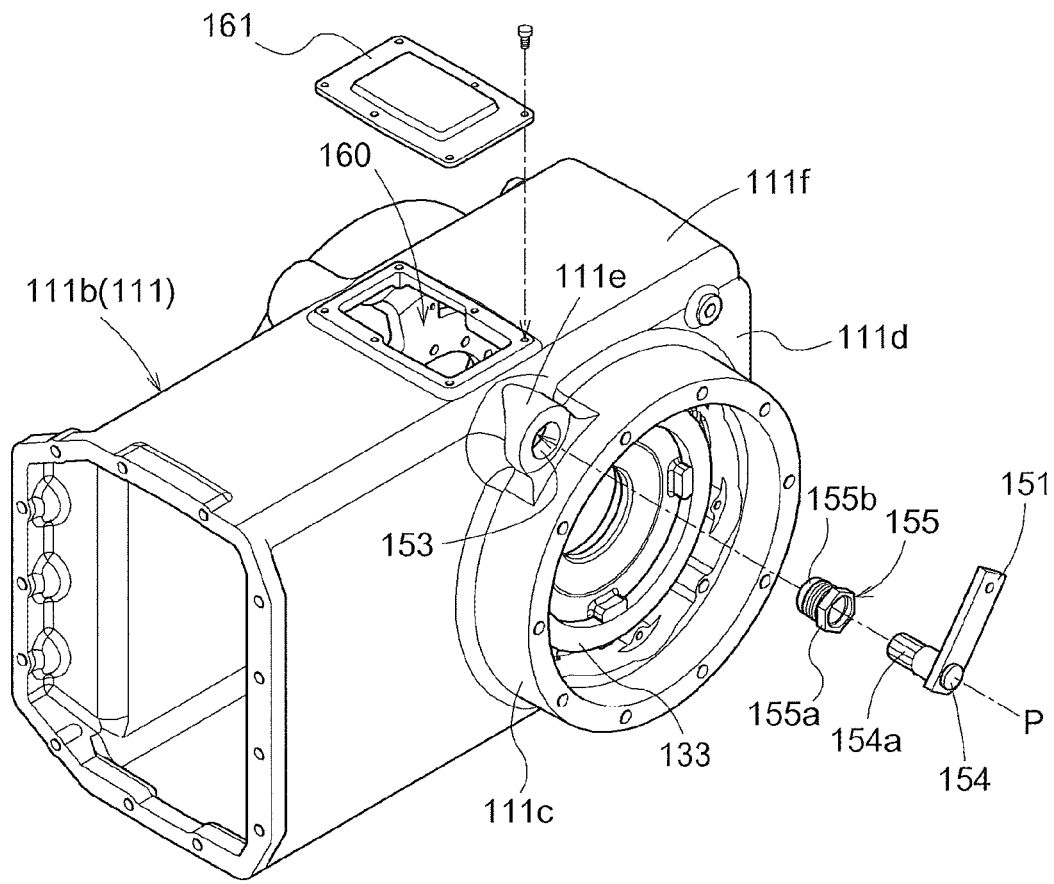
FIG. 10 is a diagram showing the second embodiment, and is a perspective view showing a rear divisional transmission case, a boss member, and a rotation support shaft.

As shown in FIGS. 9 and 10, a case support portion 111*c* is provided on a left side portion of the transmission case 111, and the axle case 112 is coupled to the case support portion 111*c* using a plurality of coupling bolts 140. The axle case 112 supports the axle 102*a* of the left rear wheel 102 so as to be rotatable. In the present embodiment, an output shaft 119*b* and the axle 102*a* are interlocked with each other via a planetary gear mechanism 141 interposed therebetween, where the planetary gear mechanism 141 decelerates power from the output shaft 119*b* of the differential mechanism 119 and transmits the resultant power to the axle 102*a*. A ring gear 141*a* of the planetary gear mechanism 141 is interposed between the case support portion 111*c* and the axle case 112. The present invention is not limited to such a configuration, and may have a configuration that is not provided with a member that is interposed between the case support portion 111*c* and the axle case 112, such as a configuration in which the output shaft 119*b* of the differential mechanism 119 and the axle 102*a* are coupled to each other by a coupling member so as not to be rotatable relative to each other.

The left brake apparatus 130 is housed in the transmission case 111 on the vehicle body frame 108. Specifically, as shown in FIG. 9, the left brake apparatus 130 includes brake discs 131, a disc receiver 132, and a rotating cam 133 that presses the brake discs 131 against the disc receiver 132. The brake discs 131, the disc receiver 132, and the rotating cam 133 are housed in the case support portion 111*c* of the transmission case 111. The present embodiment employs a brake apparatus 130 that has four brake discs 131. The brake apparatus is not limited to such a configuration, and may have three or less, or five or more brake discs 131.

Each of the four brake discs 131 engages with a spline shaft portion 119*d* of the output shaft 119*b* of the differential mechanism 119 so as not to be rotatable relative to the spline shaft portion 119*d* but so as to be slidable. The disc receiver 132 is fitted into the case support portion 111*c*. An outer circumferential surface side portion of the disc receiver 132 is sandwiched between a positioning portion 134 that is provided in the case support portion 111*c* and the ring gear 141*a*, and thus the disc receiver 132 is positioned at an attachment position of the case support portion 111*c*. The rotating cam 133 is fitted onto a flange portion 142*a* of a cam support portion 142 of the transmission case 111 so as to be rotatable relative to the flange portion 142*a* and so as to be slidable.

Upon the rotating cam 133 being rotated to an ON position by a brake operation unit 150 that has a brake operation part 151 that is provided on an outer left side of the transmission case 111, the left brake apparatus 130 enters an ON state, and brakes the left rear wheel 102 (see FIG. 7). That is to say, upon the rotating cam 133 being rotated to an ON position, the rotating cam 133 is pressed by a cam member 142*b* of the cam support portion 142 toward the brake discs 131, and the brake discs 131 are pressed by the rotating cam 133 against the disc receiver 132. The brake discs 131 pressed against the disc receiver 132 are braked by the disc receiver 132 and perform a braking action on the output shaft 119*b*, thereby performing a braking action on the axle 102*a* via the planetary gear mechanism 141. A braking reaction force that is applied to the disc receiver 132 is received by the case support portion 111*c* via the ring gear 141*a* and the coupling bolts 140.

Upon the rotating cam 133 being rotated by the brake operation unit 150 to an OFF position, the left brake apparatus 130 enters an OFF state, and releases the brake applied to the left rear wheel 102 (see FIG. 7). That is to say, upon the rotating cam 133 being shifted to the OFF position, the rotating cam 133 is released from being pressed by the cam member 142*b* toward the brake discs 131, and the brake discs 131 are released from being pressed against the disc receiver 132. The brake discs 131 that have been released from being pressed against the disc receiver 132 are released from the brake applied by the disc receiver 132 and releases the braking action acting on the output shaft 119*b*, thereby releasing the braking action acting on the axle 102*a*.

Configuration of Brake Operation Unit According to Second Embodiment

As shown in FIG. 9, the brake operation unit 150 includes the brake operation part 151 that is provided outside the transmission case 111, a cam operation arm 152 that is provided in the transmission case 111, and a rotation support shaft 154 that is supported by a side wall portion 111d of the transmission case 111.

The cam operation arm 152 is provided such that a free end portion of the cam operation arm 152 engages with an operation portion 133a of the rotating cam 133. The rotation support shaft 154 is attached to a through hole 153 of the side wall portion 111d with a boss member 155 being interposed therebetween, where the boss member 155 is fitted onto the rotation support shaft 154 so as to be rotatable relative to the rotation support shaft 154. The rotation support shaft 154 is supported by the side wall portion 111d with the boss member 155 being interposed therebetween, so as to be rotatable relative to the side wall portion 111d. The through hole 153 is formed in a portion of the side wall portion 111d where a boss portion 111e (see FIG. 10) is provided. As shown in FIG. 10, the boss portion 111e is formed so as to be coupled to an outer circumferential surface side portion of an upper portion of the case support portion 111c. A base portion of the brake operation part 151 is coupled to an end portion of the rotation support shaft 154 outside the transmission case so as not to be rotatable relative to the end portion. The brake operation part 151 and the rotation support shaft 154 are welded to each other. A base portion of the cam operation arm 152 is coupled to an end portion of the rotation support shaft 154 inside the transmission case so as not to be rotatable relative to the end portion. The cam operation arm 152 engages with a spline shaft portion 154a of the rotation support shaft 154, and thus the cam operation arm 152 and the rotation support shaft 154 are coupled to each other so as not to be rotatable relative to each other. The cam operation arm 152 is sandwiched between a stopper ring 156 and the boss member 155, and thus the cam operation arm 152 is positioned relative to the rotation support shaft 154. The cam operation arm 152 and the brake operation part 151 are interlocked with each other via the rotation support shaft 154. The cam operation arm 152 and the brake operation part 151 are supported by the side wall portion 111d using the rotation support shaft 154, and are swingable relative to the transmission case 111 about an axis P of the rotation support shaft 154.

As shown in FIG. 9, the boss member 155 is fixed to the side wall portion 111d so as to pass through the through hole 153. As shown in FIG. 10, a screw portion is formed on the outer circumferential surface of the boss member 155. The boss member 155 is fixed to the side wall portion 111d by screwing the screw portion of the boss member 155 into a screw portion that is formed inside the through hole. A flange portion 155a that is provided at a brake operation part-side end portion of the boss member 155 abuts against the outer surface of the side wall portion 111d, and thus the boss member 155 is positioned relative to the side wall portion 111d. In the present embodiment a configuration for screwing the boss member 155 into the side wall portion 111d is employed as a fixing means for fixing the boss member 155 to the side wall portion 111d. However, the present invention is not limited to such a configuration. For example, it is possible to employ a configuration in which a screw member is attached to a portion of the boss member 155 that protrudes from the side wall portion 111d to the inside of the transmission case 111, and the side wall portion 111d is sandwiched between the screw member and the flange portion 155a. Also, it is possible to employ a configuration in which screw members are attached to a portion that protrudes from the side wall portion 111d to the inside of the transmission case 111 and a portion that protrudes from the side wall portion 111d to the outside of the transmission case 111, of the boss member 155, and the side wall portion 111d is sandwiched between the inner and outer screw members.

According to the present embodiment, the axle case 112 can be coupled to the transmission case 111 to which the brake apparatus 130 and the brake operation unit 150 are attached. Therefore, it is possible to separately perform work to attach the brake apparatus 130 and the brake operation unit 150, and work to attach the axle case 112. Although the boss member 155 is employed in the present embodiment, a configuration in which the rotation support shaft 154 is directly supported by the side wall portion 111d may be employed instead of the boss member 155.

As shown in FIG. 9, a cam operation arm-side portion 155b of the boss member 155 protrudes from the side wall portion 111d to the inside of the transmission case 111, and abuts against a base end-side portion of the cam operation arm 152. A gap S1 is provided by the cam operation arm-side portion 155b of the boss member 155 between the cam operation arm 152 and the side wall portion 111d. The inner surface of the transmission case 111 cannot be polished, for example, and the inner surface of the side wall portion 111d remains a cast surface. However, the cam operation arm 152 does not abut against the inner surface of the side wall portion 111d due to the gap S1, and swings smoothly.

As shown in FIG. 9, the flange portion 155a, which is a brake operation part-side portion, of the boss member 155 protrudes from the side wall portion 111d to the outside of the transmission case 111, and abuts against a base end-side portion of the brake operation part 151. A gap S2 is provided by the flange portion 155a of the boss member 155 between the brake operation part 151 and the side wall portion 111d. Due to the gap S2, a coupling member that couples a brake pedal (not shown) to the brake operation part 151, such as an interlock rod, can be coupled to the brake operation part 151 without coming into contact with the side wall portion 111d.

The boss member 155 positions the cam operation arm 152 relative to the side wall portion 111d and positions the brake operation part 151 relative to the side wall portion 111d, and the positional relationship between the cam operation arm 152 and the rotating cam 133 is kept as a positional relationship in which a free end portion of the cam operation arm 152 appropriately affects the operation portion 133a of the rotating cam 133.

In the brake operation unit 150, the brake operation part 151 is operated so as to swing about the axis P of the rotation support shaft 154, and thus the rotation support shaft 154 is rotated. As shown in FIG. 7, in a side view of the vehicle body, the axis P is located forward of and upward of the axis X of the axle 102a. The brake operation part 151 smoothly swings without coming into contact with the outer surface of the side wall portion 111d due to the gap S2, and the rotation support shaft 154 is smoothly rotated. Upon the rotating cam 133 being rotated, the cam operation arm 152 is operated by the rotation support shaft 154 so as to swing. Due to the gap S1, the cam operation arm 152 smoothly swings without coming into contact with the inner surface of the side wall portion 111d, which remains a cast surface. Upon the cam operation arm 152 being operated so as to swing, the operation portion 133a of the rotating cam 133 is pressed by a free end portion of the cam operation arm 152 and the rotating cam 133 is rotated.

As shown in FIGS. 9 and 10, an upper wall portion 111f of the transmission case 111 is provided with a work hole 160 that is formed in a portion above the cam operation arm 152, of the upper wall portion 111f, and a lid member 161 that closes the work hole 160 in normal times and opens the work hole 160 when the work hole 160 is to be used. The work hole 160 is provided such that the boss portion 111e and the brake operation part 151 are located laterally outward of the work hole 160. The lid member 161 is opened and closed by being attached to and detached from the upper wall portion 111f. When attachment work or inspection work is to be carried out on the brake apparatus 130, work can be performed on the cam operation arm 152, the stopper ring 156, and so on by putting a tool or a hand into the transmission case 111 from the outside through the work hole 160.

Variation of Second Embodiment (1) The above-described embodiment shows an example in which the through hole 153 is formed in a portion of the side wall portion 111d where the boss portion 111e is provided. However, the present invention may be carried out without the boss portion 111e.
(2) The above-described embodiment employs a brake apparatus 130 that is provided with four brake discs 131. However, a brake apparatus that is provided with three or less, or five or more brake discs 131 may be employed.
(3) In the above-described embodiment, the front wheels 101 and the rear wheels 102 are installed. However, semi-crawlers may be installed.

INDUSTRIAL APPLICABILITY

The present invention is applicable to a tractor that is provided with semi-crawlers instead of front wheels and rear wheels.

DESCRIPTION OF REFERENCE SIGNS

First Embodiment

3: Engine
11: Transmission Case
20: Forward/rearward Travel Switching Apparatus
22: Clutch Unit
23: Forward Travel Output Unit (Forward Travel Output Gear)
24: Rearward Travel Output Unit (Rearward Travel Output Gear)
28: Rotating Power Transmission Shaft
30: High/low Speed Switching Apparatus
40: Gear Transmission
41: Input Part (Input Shaft)
54b: Output Shaft Gear
60: Creep Speed Changing Apparatus
61: Relay Shaft (Creep Shaft)
62: First Deceleration Gear
63: Second Deceleration Gear
64: Third Deceleration Gear
65: Pair of Deceleration Gears
66: First Power Transmission Gear
67: Second Power Transmission Gear
68: Third Power Transmission Gear
69: Pair of Deceleration Gears
70: Differential Mechanism Second Embodiment 102a: Axle
108: Vehicle Body Frame
111: Transmission Case
111d: Side Wall Portion
111f: Upper Wall Portion
112: Axle Case
119: Differential Mechanism
130: Brake Apparatus
131: Brake Disc
132: Disc Receiver
133: Rotating Cam
140: Coupling Bolt
151: Brake Operation Part
152: Cam Operation Arm
153: Through Hole
154: Rotation Support Shaft
155: Boss Member
155a: Brake Operation Part-side Portion (Flange Portion)
155b: Cam Operation Arm-side Portion
160: Work Hole
161: Lid Member

The invention claimed is:

1. A travel power transmission apparatus for a tractor, comprising:
   a gear transmission to which power from an engine is input, and that changes the speed of the input power and outputs the resulting power;
   a creep speed changing apparatus to which the output from the gear transmission is input, and that decelerates the input power and outputs the resulting power to a differential mechanism for a rear wheel; and
   a transmission case that houses the gear transmission and the creep speed changing apparatus,
   wherein the gear transmission includes:
      an output shaft that transmits power to the differential mechanism; and
      an output shaft gear that is supported by the output shaft, and is switchable to a power transmission ON state in which the output shaft gear engages with the output shaft so as not to be rotatable relative to the output shaft, and transmits power to the output shaft, and to a power transmission OFF state in which the output shaft gear is disengaged from the output shaft and disconnects power transmission to the output shaft, and
   the creep speed changing apparatus includes:
      a relay shaft that is parallel with the output shaft;
      a first power transmission gear that is provided so as not to be rotatable relative to the output shaft gear;
      a first deceleration gear that is supported by the relay shaft in a state of meshing with the first power transmission gear, and rotates at a lower speed than the first power transmission gear;
      a second power transmission gear that is provided so as not to be rotatable relative to the first deceleration gear;
      a second deceleration gear that is supported by the output shaft in a state of meshing with the second power transmission gear, and rotates at a lower speed than the second power transmission gear;
   wherein the relay shaft further includes:
      a third power transmission gear that is provided so as not to be rotatable relative to the second deceleration gear;
      a third deceleration gear that is supported by the relay shaft so as not to be rotatable relative to the relay shaft, in a state of meshing with the third power transmission gear, and rotates at a lower speed than the third power transmission gear; and a pair of deceleration gears that are provided so as to span the relay shaft and the output shaft, and are switchable to a power transmission ON state in which the pair of deceleration gears decelerate power from the relay shaft and transmit the resulting power to the output shaft, and a power transmission OFF state in which the pair of deceleration gears disconnect power transmission to the output shaft, wherein the first deceleration gear is supported by the relay shaft so as to be rotatable relative to the relay shaft, the second deceleration gear is supported by the output shaft so as to be rotatable relative to the output shaft, and the pair of the deceleration gears are located on the opposite side to the first deceleration gear with respect to the output shaft gear in a direction in which an axis of the relay shaft extends.

2. The travel power transmission apparatus for a tractor according to claim 1, wherein the relay shaft is provided at a position lower than the output shaft, and a clutch that switches the pair of deceleration gears to the power transmission ON state and the power transmission OFF state is provided so as to span a power transmission gear that is one gear of the pair of deceleration gears and is supported by the relay shaft, and the relay shaft.

3. The travel power transmission apparatus for a tractor according to claim 1, further comprising:

a forward/rearward travel switching apparatus that includes a clutch unit to which power from the engine is input and that converts the input power into forward travel power and rearward travel power, and separately includes a forward travel output unit that outputs the thus converted forward travel power, and a rearward travel output unit that outputs the thus converted rearward travel power;

a rotating power transmission shaft that is provided so as to span the rearward travel output unit and an input part of the gear transmission, and transmits power from the rearward travel output unit to the input part; and a high/low speed switching apparatus that is provided so as to span the forward travel output unit and the rotating power transmission shaft, and is switchable to a high-speed power transmission state in which the high/low speed switching apparatus changes the speed of power from the forward travel output unit to a high-side speed and transmits the resulting power to the rotating power transmission shaft, and a low-speed power transmission state in which the high/low speed switching apparatus changes the speed of power from the forward travel output unit to a low-side speed and transmits the resulting power to the rotating power transmission shaft.

4. The travel power transmission apparatus for a tractor according to claim 3, wherein the rotating power transmission shaft and the input part are coaxially arranged in a straight line.

5. The travel power transmission apparatus for a tractor according to claim 3, wherein the rearward travel output unit is provided forward of the clutch unit and the forward travel output unit is provided rearward of the clutch unit.

6. A tractor comprising the travel power transmission apparatus for a tractor of claim 1.

* * * * *